(12) United States Patent
Ryu et al.

(10) Patent No.: US 10,840,757 B2
(45) Date of Patent: Nov. 17, 2020

(54) ELECTRIC MOTOR WITH PERMANENT MAGNET AND COMPRESSOR HAVING THE SAME

(71) Applicant: LG Electronics Inc., Seoul (KR)

(72) Inventors: Dongseok Ryu, Seoul (KR); Sangjoon Eum, Seoul (KR); Kiman Kim, Seoul (KR)

(73) Assignee: LG Electronics Inc., Seoul (KR)

(*) Notice: Subject to any disclaimer, the term of this patent is extended or adjusted under 35 U.S.C. 154(b) by 236 days.

(21) Appl. No.: 15/945,927

(22) Filed: Apr. 5, 2018

(65) Prior Publication Data

US 2018/0294685 A1 Oct. 11, 2018

(30) Foreign Application Priority Data

Apr. 6, 2017 (KR) .................. 10-2017-0044930
Apr. 6, 2017 (KR) .................. 10-2017-0044932

(51) Int. Cl.
*H02K 1/27* (2006.01)
*H02K 1/16* (2006.01)
(Continued)

(52) U.S. Cl.
CPC .......... *H02K 1/278* (2013.01); *F04C 29/0085* (2013.01); *H02K 1/16* (2013.01);
(Continued)

(58) Field of Classification Search
CPC . F04C 29/0085; F04C 2210/26; H02K 1/276; H02K 1/16; H02K 1/2766;
(Continued)

(56) References Cited

U.S. PATENT DOCUMENTS 9,231,445 B2 * 1/2016 Sano .................. H02K 1/27
2006/0284507 A1 * 12/2006 Murakami .......... H02K 1/2793
310/156.37
(Continued)

FOREIGN PATENT DOCUMENTS

JP   H05076147    3/1993
JP   2004-320925  11/2004
(Continued)

OTHER PUBLICATIONS

Translation of foreign document JP 2010283978 A (Year: 2010).*
(Continued)

*Primary Examiner* — Alex W Mok
(74) *Attorney, Agent, or Firm* — Fish & Richardson P.C.

(57) ABSTRACT

An electric motor includes a stator, and a rotor spaced apart from the stator by a gap. The rotor includes a first magnet that generates first magnetic flux, that includes first magnetic portions arranged in a circumferential direction of the rotor, and that are configured to generate a magnetic field in the gap, and second magnetic portions that are alternately arranged with the plurality of first magnetic portions along the circumferential direction of the rotor. The rotor further includes a plurality of second magnets that are each located between a first magnetic portion of the first magnetic portions and a second magnetic portion of the second magnetic portions that is adjacent to the first magnetic portion, where each second magnet generates second magnetic flux that is greater than the first magnetic flux, and the first magnet is located radially between the gap and the plurality of second magnets.

18 Claims, 20 Drawing Sheets

(51) Int. Cl.
*H02K 1/30* (2006.01)
*F04C 29/00* (2006.01)

(52) U.S. Cl.
CPC ........... *H02K 1/276* (2013.01); *H02K 1/2766* (2013.01); *H02K 1/30* (2013.01); *F04C 2210/26* (2013.01)

(58) Field of Classification Search
CPC  H02K 1/278; H02K 1/30; H02K 1/26; H02K 2201/03
USPC .......................................................... 310/51
See application file for complete search history.

(56) References Cited

U.S. PATENT DOCUMENTS

| | | | | |
|---|---|---|---|---|
| 2009/0015090 | A1* | 1/2009 | Kimura | H02K 1/276 310/156.08 |
| 2014/0042854 | A1* | 2/2014 | Asahi | H02K 1/2706 310/156.08 |
| 2016/0079816 | A1* | 3/2016 | Islam | H02K 1/276 310/156.38 |
| 2016/0247616 | A1* | 8/2016 | Smith | H02K 21/12 |
| 2016/0294251 | A1* | 10/2016 | Fukasaku | H02K 7/04 |

FOREIGN PATENT DOCUMENTS

| | | |
|---|---|---|
| JP | 2010283978 | 12/2010 |
| JP | 2013121263 | 6/2013 |
| JP | 5501660 | 5/2014 |
| JP | 5752273 | 7/2015 |
| KR | 10-2011-0032988 | 3/2011 |
| KR | 20110032988 | 3/2011 |

OTHER PUBLICATIONS

Translation of foreign document KR 20110032988 (Year: 2011).*
European Extended Search Report in European Application No. 18165776.8, dated Jul. 23, 2018, 7 pages.

* cited by examiner

ELECTRIC MOTOR WITH PERMANENT MAGNET AND COMPRESSOR HAVING THE SAME

CROSS-REFERENCE TO RELATED APPLICATION

Pursuant to 35 U.S.C. § 119(a), this application claims the benefit of an earlier filing date of and the right of priority to Korean Application Nos. 10-2017-0044930 and 10-2017-0044932, each filed on Apr. 6, 2017, the contents of which are incorporated by reference herein in their entirety.

FIELD

The present disclosure relates to an electric motor with a permanent magnet, and a compressor having the same.

BACKGROUND

An electric motor is an apparatus that can convert electric energy into mechanical energy.

Electric motors may be classified into a direct current (DC) type motor, a single-phase alternating current (AC) type motor, and a three-phase AC type motor based on an power supply system that supplies power (e.g., electric power) to the motors.

The electric motor may include a stator and a rotor that is movable relative to the stator with a predetermined gap therebetween.

A part of the rotor may include a rotor core having a rotation shaft, a plurality of conductor bars inserted into the rotor core in an axial direction, and an end ring connecting the conductor bars.

Another part of the rotor may include a permanent magnet and a rotor frame that includes a rotation shaft to support the permanent magnet.

In some examples, an electric motor having the permanent magnet may include a magnetic body (e.g., a back yoke) that is provided at a rear of the permanent magnet to form a flux path, which may increase a mass of the rotor.

Vibration and noise may increase as the mass of the rotor increases. In some cases, when the mass of the rotor is increased, the inertia of the rotor is increased, which may make it difficult to start and stop the rotor.

In some examples, the magnetic body may be formed of a high-priced material such as magnetic steel sheets, electromagnetic steel sheets, or silicon steel sheets having a high magnetic property, which may cause an increase in fabricating costs.

A compressor may include a case, a compression unit provided inside of the case to compress a refrigerant, and an electric motor provided inside of the case to supply driving force to the compression unit.

The compression unit includes a cylinder and a roller that is provided inside of the cylinder and connected to the rotation shaft of the electric motor to be able to roll.

The electric motor of the compressor may include a stator fixed to the inside of the case and a rotor disposed in the stator to be rotatable centering on the rotation shaft.

In some cases, the compressor may include bearings located on both sides of the cylinder along the axial direction of the cylinder so as to rotatably support the rotation shaft protruding to the both sides of the cylinder.

In some examples, the rotor may include the rotor core made of a magnetic material and a permanent magnet coupled to the rotor core. This may increase the mass of the rotor, which may result in an increase of vibration and noise.

In some cases where one side of the rotor is supported by the bearings extending along the axial direction of the rotation shaft, abrasion of the bearings may greatly increase when the mass and the vibration are increased.

In some examples, a surface-mounted permanent magnet (SPM) type rotor, which includes a permanent magnet disposed on an outer surface of the rotor core, may use a high-priced permanent magnet material to increase magnetic flux density in a gap. In this case, fabricating cost may increase.

SUMMARY

One aspect of the present disclosure is to provide an electric motor that includes a permanent magnet, that can suppress generation of vibration and noise, and that can improve an output power, and a compressor having the same.

Another aspect of the present disclosure is to provide an electric motor that includes a permanent magnet, that can reduce a fabricating cost by reducing the use of an expensive permanent magnet, and that can improve an output power, and a compressor having the same.

Another aspect of the present disclosure is to provide an electric motor that includes a permanent magnet and that can facilitate fabrication of a rotor, and a compressor having the same.

Another aspect of the present disclosure is to provide an electric motor that includes a permanent magnet and that can reduce damage of the permanent magnet, and a compressor having the same.

According to one aspect of the subject matter described in this application, an electric motor includes a stator, and a rotor spaced apart from the stator by a gap in a radial direction of the rotor and configured to rotate with respect to the stator, where the rotor includes a rotation shaft and a rotor magnet (e.g., a permanent magnet) located at an outer circumferential portion of the rotor. The rotor magnet includes a first magnet configured to generate first magnetic flux, where the first magnet includes a plurality of first magnetic portions arranged in a circumferential direction of the rotor, each first magnetic portion having a first polarity and a second polarity that are magnetically opposite to each other and that are configured to generate a magnetic field in the gap, and a plurality of second magnetic portions alternately arranged with the plurality of first magnetic portions along the circumferential direction of the rotor, each second magnetic portion having a first polarity and a second polarity that are magnetically opposite to each other and that are configured to generate a magnetic field in the gap. The rotor magnet further includes a plurality of second magnets that are each located between a first magnetic portion of the plurality of first magnetic portions and a second magnetic portion of the plurality of second magnetic portions that is adjacent to the first magnetic portion, each second magnet being configured to generate second magnetic flux that is greater than the first magnetic flux generated by the first magnet. The first magnet is located radially between the gap and the plurality of second magnets.

Implementations according to this aspect may include one or more of the following features. For example, each first magnetic portion may have the first polarity and the second polarity at end parts of a respective first magnetic portion, where each first magnetic portion is configured to generate a first magnetic field from the first polarity to the second polarity in a first direction. Each second magnetic portion may have the first polarity and the second polarity at end parts of a respective second magnetic portion, where each second magnetic portion is configured to generate a second magnetic field from the first polarity to the second polarity in a second direction opposite to the first direction.

In some implementations, the first magnet further includes a plurality of boundary regions that are each located between a first magnetic portion of the plurality of first magnetic portions and a second magnetic portion that is adjacent to the first magnetic portion, where the first magnet defines second magnet inserting portions that are each located at the plurality of boundary regions and that are configured to respectively receive the plurality of second magnets, and each boundary region faces the first polarity of each of the first magnetic portion and the second magnetic portion or the second polarity of each of the first magnetic portion and the second magnetic portion. In some examples, each second magnet has a first polarity and a second polarity that are magnetically opposite to each other and that are disposed in the radial direction of the rotor, and a polarity of each second magnet at a boundary region of the plurality of boundary regions corresponds to one of the first polarity or the second polarity that is generated by the first magnetic portion of the plurality of first magnetic portions and the second magnetic portion that is adjacent to the first magnetic portion.

In some implementations, the first magnet has a cylindrical shape. The first magnet may include a magnet manufactured by bonding. The plurality of second magnets may include a magnet manufactured by sintering. The rotor further comprises a rotor frame disposed between the rotation shaft and the rotor magnet and configured to rotatably support the rotor magnet. Each second magnet may be configured to insert between the first magnet and the rotor frame along an axial direction of the rotor. The rotor frame may be made of a non-magnetic material. The rotor frame may define second magnet inserting portions configured to respectively receive the plurality of second magnets. The rotor frame may define a through hole that penetrates the rotor frame in an axial direction of the rotor.

In some implementations, the plurality of first magnetic portions and the plurality of second magnetic portions may correspond to a plurality of magnetic poles of the rotor, where the stator includes a plurality of poles and a plurality of slots that are alternately arranged along a circumferential direction of the stator, a number of the plurality of slots of the stator being different than a number of the plurality of magnetic poles of the rotor. Each pole of the stator may include a pole shoe that extends in the circumferential direction of the stator and that has a size corresponding to a size of each second magnet of the rotor.

In some examples, a second magnet of the plurality of second magnets may be located between extension lines that respectively extend from a center of the rotor to ends of the pole shoe, the second magnet having a first end and a second end, where an internal angle between a first extension line extending from the center of the rotor to the first end of the second magnet and a second extension line extending from the center of the rotor to the second end of the second magnet is in a range from 19° to 26°. In some examples, a distance from each second magnet to an outer surface of the first magnet may be greater than or equal to 1 mm.

In some implementations, each second magnet may be configured to couple to an inside of the first magnet recessed from an inner surface of the first magnet toward the gap, where an outer surface of each second magnet facing toward the gap has a curved shape corresponding to a shape of an outer surface of the first magnet, and a distance between the outer surface of each second magnet and the outer surface of the first magnet is constant. In some examples, each second magnet has an outer surface portion that is curved and that faces toward the first magnet, and an inner surface portion that is flat and that is located radially inward of the outer surface portion. In some examples, each second magnet has an outer surface portion that faces toward the first magnet, and an inner surface portion that is disposed radially inward of the outer surface portion, where the outer surface portion includes end parts, a thickness from the inner surface portion to the end parts decreasing in the circumferential direction of the rotor.

According to another aspect of the subject matter described in this application, a compressor includes a case, a compressor located inside of the case and configured to compress fluid, and an electric motor that is located inside of the case and that includes a stator and a rotor spaced apart from the stator by a gap in which the rotor includes a rotor magnet configured to provide driving force to the compressor. The rotor magnet includes a first magnet configured to generate first magnetic flux, where the first magnet includes a plurality of first magnetic portions arranged in a circumferential direction of the rotor, each first magnetic portion having a first polarity and a second polarity that are magnetically opposite to each other and that are configured to generate a magnetic field in the gap, and a plurality of second magnetic portions alternately arranged with the plurality of first magnetic portions along the circumferential direction of the rotor, each second magnetic portion having the first polarity and the second polarity configured to generate a magnetic field in the gap. The rotor magnet further includes a plurality of second magnets that are each located between a first magnetic portion of the plurality of first magnetic portions and a second magnetic portion of the plurality of second magnetic portions that is adjacent to the first magnetic portion, each second magnet being configured to generate second magnetic flux that is greater than the first magnetic flux generated by the first magnet. The first magnet is located radially between the gap and the plurality of second magnets.

In some implementations, a permanent magnet of a rotor may include a first magnet having a plurality of opposite magnetic poles alternately arranged along a circumferential direction and polar-anisotropically magnetized to form a magnetic field in a gap, and second magnets each having magnetic flux stronger than that of the first magnet and arranged at a center of the plurality of magnetic poles, whereby a manufacturing cost of the permanent magnet can be reduced and a main magnetic flux can be increased so as to improve an output of the electric motor.

In some implementations, since the first magnet is polar-anisotropically magnetized, a flux path may not be formed in the first magnet. Therefore, permanent magnet supporting structures for supporting the permanent magnet inside the permanent magnet may be less restricted on material, shape and size, which may facilitate a fabrication of a rotor.

In some implementations, since the first magnet is polar-anisotropically magnetized, the flux path is not formed in the first magnet. Therefore, permanent magnet supporting structures for supporting the permanent magnet inside the permanent magnet may be less restricted on material, shape and size, thereby reducing a fabricating cost of the rotor.

In some implementations, the first magnet may be formed in a cylindrical shape and second magnets each having magnetic flux stronger than that of the first magnet may be provided at a center of magnetic poles of the first magnet. Accordingly, magnetic flux density of a gap can have a sinusoidal shape with an increased main magnetic flux, thereby reducing cogging torque and preventing a generation of vibration and noise.

In some implementations, the first magnet may be configured as a bonded magnet and the second magnet may be configured as a sintered magnet, which may result in reducing a fabricating cost of the permanent magnet and facilitating a fabrication of the permanent magnet.

In some implementations, the first magnet may be configured as a bonded magnet and a rotor frame may be made of a lightweight non-magnetic material, which may result in facilitating a fabrication of the rotor, and reducing a fabricating cost of the rotor.

The first magnet may be formed in the cylindrical shape, each second magnet having the magnetic flux stronger than that of the first magnet may be provided at the center of the magnetic poles of the first magnet, and the second magnet may be formed such that a thickness thereof gradually decreases from its center toward both end portions, which may result in preventing a reduction of a thickness between both end portions of the second magnet and an outer diameter surface of the first magnet, and thus preventing damage on the first magnet.

In some implementations, the second magnet may be disposed closer to the gap, so that magnetic flux density of the gap can be further increased. This may result in further enhancing an output of the electric motor.

The first magnet may be formed in the cylindrical shape, each second magnet having the magnetic flux stronger than that of the first magnet may be provided at the center of the magnetic poles of the first magnet, and the second magnet may be provided with an outer surface portion corresponding to an outer shape of the first magnet. Accordingly, a thickness between an outer surface of the first magnet and the outer surface portion of the second magnet can be made constant, thereby preventing damage of the first magnet caused by a reduced thickness between the first magnet and the second magnet.

The first magnet may be formed in the cylindrical shape, each second magnet having the magnetic flux stronger than that of the first magnet may be provided at the center of the magnetic poles of the first magnet, and the second magnet may be provided with thickness-reduced portions on both end parts thereof in the circumferential direction in a manner that a thickness is gradually decreases. This may result in preventing damage of the first magnet caused by the reduced thickness between the outer surface of the first magnet and both end parts of the second magnet.

In some implementations, the first magnet may be configured as a bonded magnet and the second magnet may be configured as a sintered magnet, which may result in reducing a fabricating cost of the permanent magnet and facilitating a fabrication of the permanent magnet.

DETAILED DESCRIPTION

Figure 1:
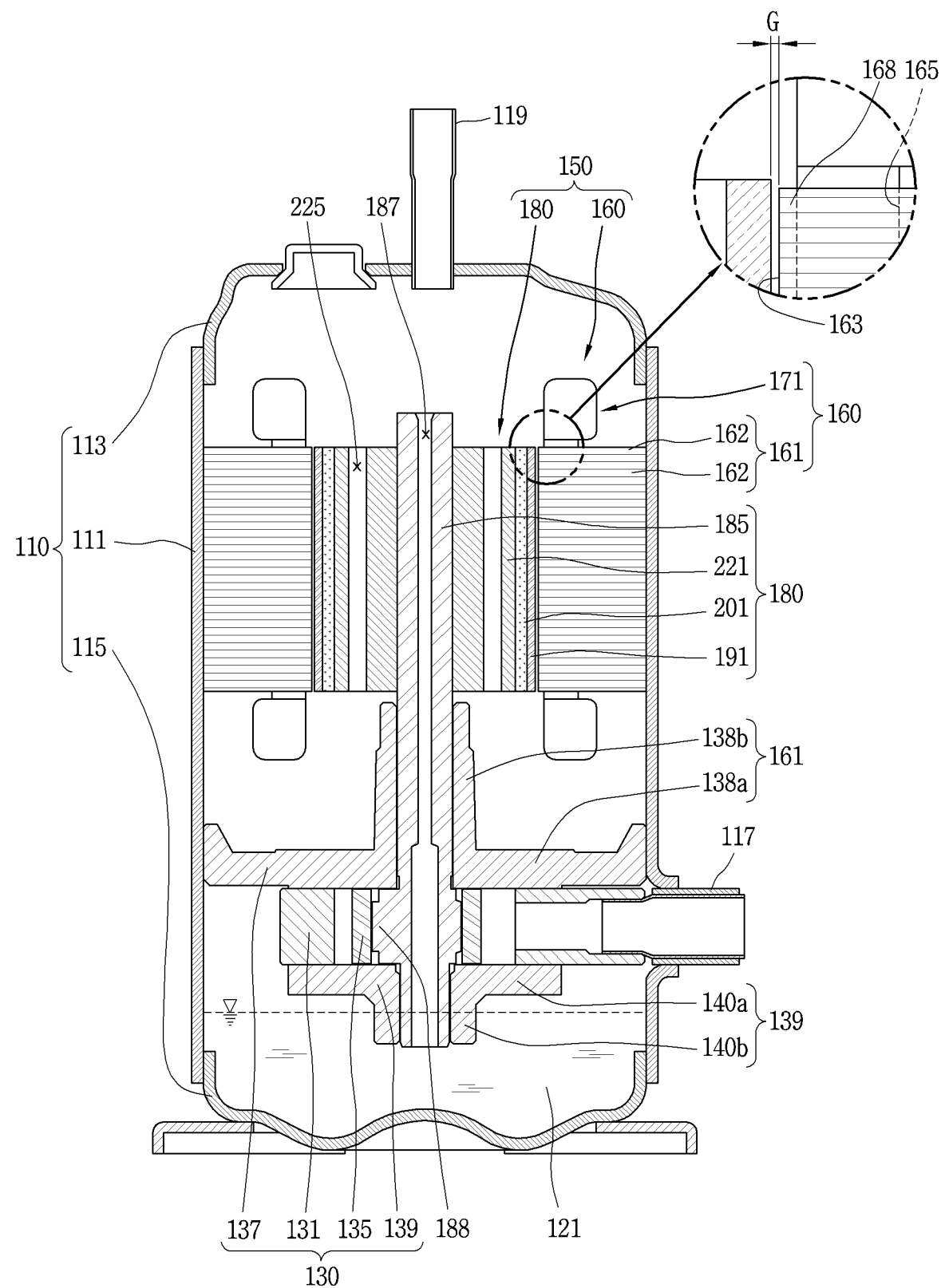
FIG. 1 is a sectional view of an example compressor including an example electric motor with an example permanent magnet.
Figure 2:
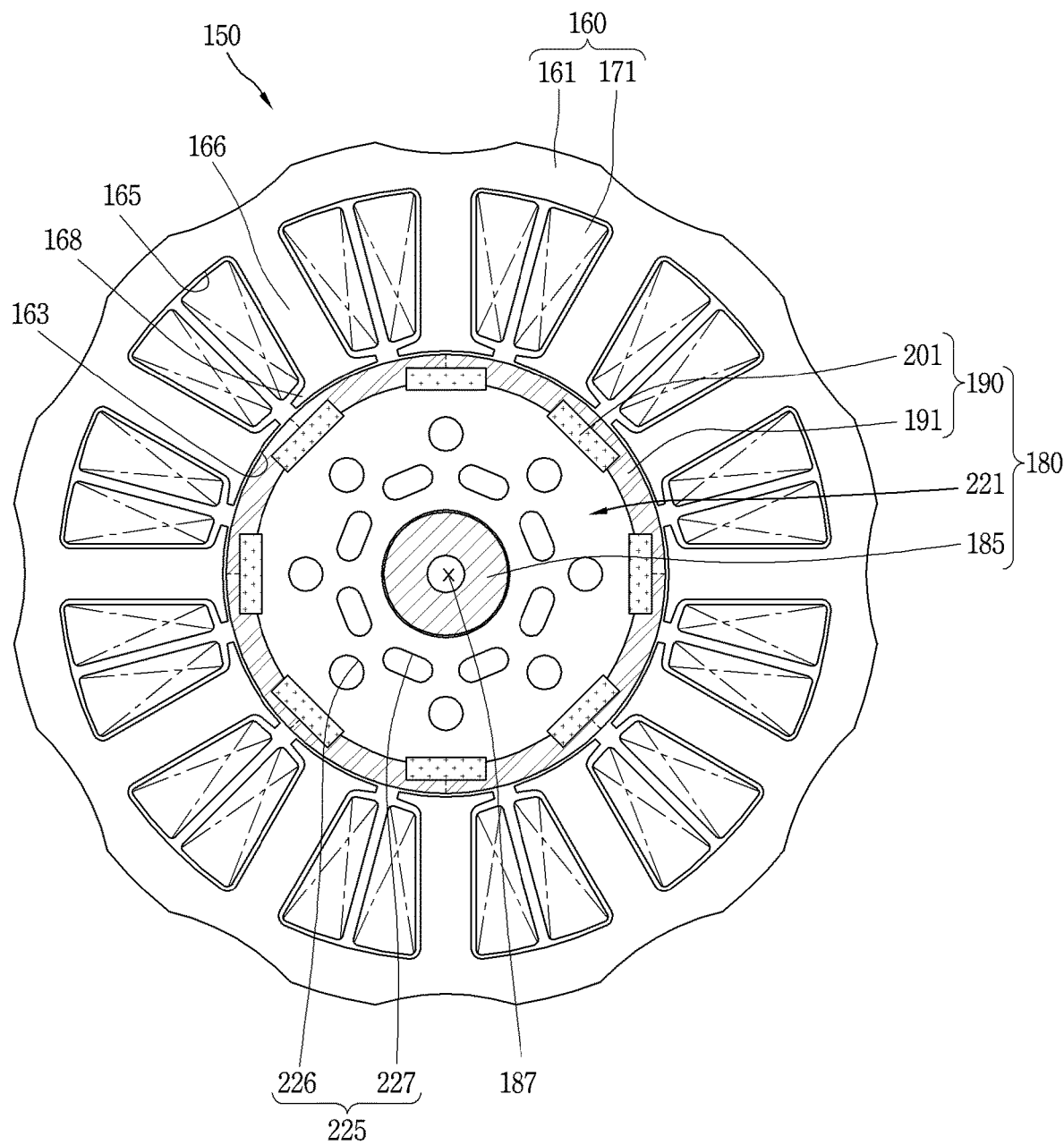
FIG. 2 is a planar view of an example stator and an example rotor of FIG. 1.

FIG. 1 is a sectional view of an example compressor that includes an example electric motor with an example magnet, and FIG. 2 is a planar view of an example stator and an example rotor of FIG. 1. The magnet may be a permanent magnet.

As illustrated in FIGS. 1 and 2, a compressor, which includes an electric motor with a permanent magnet, may also include a case 110, a compression unit 130 provided in the case 110 to compress fluid, and a motor 150 provided with a permanent magnet, disposed inside the case 110 to provide driving force to the compression unit 130.

In some examples, the case 110 may define an accommodating space therein. For example, the case 110 may define a hermetic accommodating space (e.g., a hermetic space) at an inside of the case 110.

In some examples, the case 110 may include a body 111 in a cylindrical shape, and caps provided on the body 111. The caps, for example, may include a first cap 113 and a second cap 115 provided at both end portions of the body 111.

In more detail, the body 111 may be disposed in an up and down direction. The first cap 113 may be provided on an upper portion of the body 111, and the second cap 115 may be provided on a lower portion of the body 111.

A suction pipe 117 may be provided at one region of the case 110.

Accordingly, a refrigerant outside the case 110 may be introduced into the case 110 through the suction pipe 117.

The suction pipe 117 may be provided at one side surface of the lower portion of the body 111, for example.

The compression unit 130 may be provided inside the case 110.

The compression unit 130 may be provided in a lower region inside the case 110.

The suction pipe 117 may be connected to communicate with the compression unit 130.

A discharge pipe 119 may be provided at another region of the case 110.

Accordingly, a refrigerant in the case 110 can be discharged to the outside of the case 110 through the discharge pipe 119.

The discharge pipe 119 may be provided at a top of the case 110, for example.

The compression unit 130, for example, may include a cylinder 131 having a compression space formed therein, and a roller 135 rotated inside the cylinder 131.

The cylinder 131 may be configured to be open on both sides thereof (upper and lower sides in the drawing), for example.

The compression unit 130 may include a main bearing 137 and a sub bearing 139 provided on both sides of the cylinder 131, respectively.

For example, the main bearing 137 may be provided on an upper side of the cylinder 131.

The sub bearing 139 may be provided on a lower side of the cylinder 131.

The main bearing 137 may extend relative to the cylinder 131 so as to block the upper side of the cylinder 131.

For example, the main bearing 137 may include a blocking portion 138a coupled to the cylinder 131 and a bearing portion 138b protruding from the blocking portion 138a.

The blocking portion 138a of the main bearing 137 may be fixedly coupled to an inner surface of the case 110.

The sub bearing 139 may extend relative to the cylinder 131 and may be coupled to block the lower side of the cylinder 131.

The sub bearing 139, for example, may include a blocking portion 140a coupled to the cylinder 131 and a bearing portion 140b protruding from the blocking portion 140a.

A rotation shaft 185 of the electric motor to be explained later may be inserted into each of the main bearing 137 and the sub bearing 139 so as to be rotatably supported.

Oil 121 may be accommodated (filled) in the case 110.

The oil 121, for example, may be accommodated (filled) in a lower portion of the case 110 up to a preset height.

On the other hand, the case 110 may be provided therein with the electric motor 150 having a permanent magnet according to one implementation of the present disclosure.

The electric motor 150 may include a stator 160, and a rotor 180 rotatably disposed with a preset gap G from the stator 160.

The stator 160 may include a stator core 161 and a stator coil 171 wound around the stator core 161.

The stator 160 may include, for example, a rotor receiving hole 163 in which the rotor 180 is received.

The stator core 161, for example, may be formed by stacking in an insulating manner a plurality of electrical steel plates 162 each having the rotor receiving hole 163 through a center thereof.

The rotor 180 may include a rotation shaft 185 and a permanent magnet 190 disposed concentrically with the rotation shaft 185.

For example, the rotor 180 may include a rotation shaft 185, a permanent magnet 190 disposed concentrically with the rotation shaft 185, and a rotor frame 221 disposed between the rotation shaft 185 and the permanent magnet 190 to support the permanent magnet 190.

The rotation shaft 185 may have a long length such that one end thereof is connected to the roller 135 and another end is connected to the rotor frame 221.

A through hole 187 may be formed through the inside of the rotation shaft 185.

Accordingly, the oil in the lower portion of the case 110 can flow (be transferred) upward through the through hole 187 when the rotation shaft 185 rotates.

The rotation shaft 185 may be provided with an eccentric portion 188. The eccentric portion 188 may be coupled with the roller 135.

For example, the eccentric portion 188 may be spaced apart (eccentric) from a center of the rotation shaft 185 by a preset distance.

Accordingly, the roller 135 coupled to the eccentric portion 188 may eccentrically move (rotates) within the cylinder 131 centering on the rotation shaft 185, such that a refrigerant can be introduced into the cylinder 131, compressed and then discharged to the outside of the cylinder 131.

Figure 3:
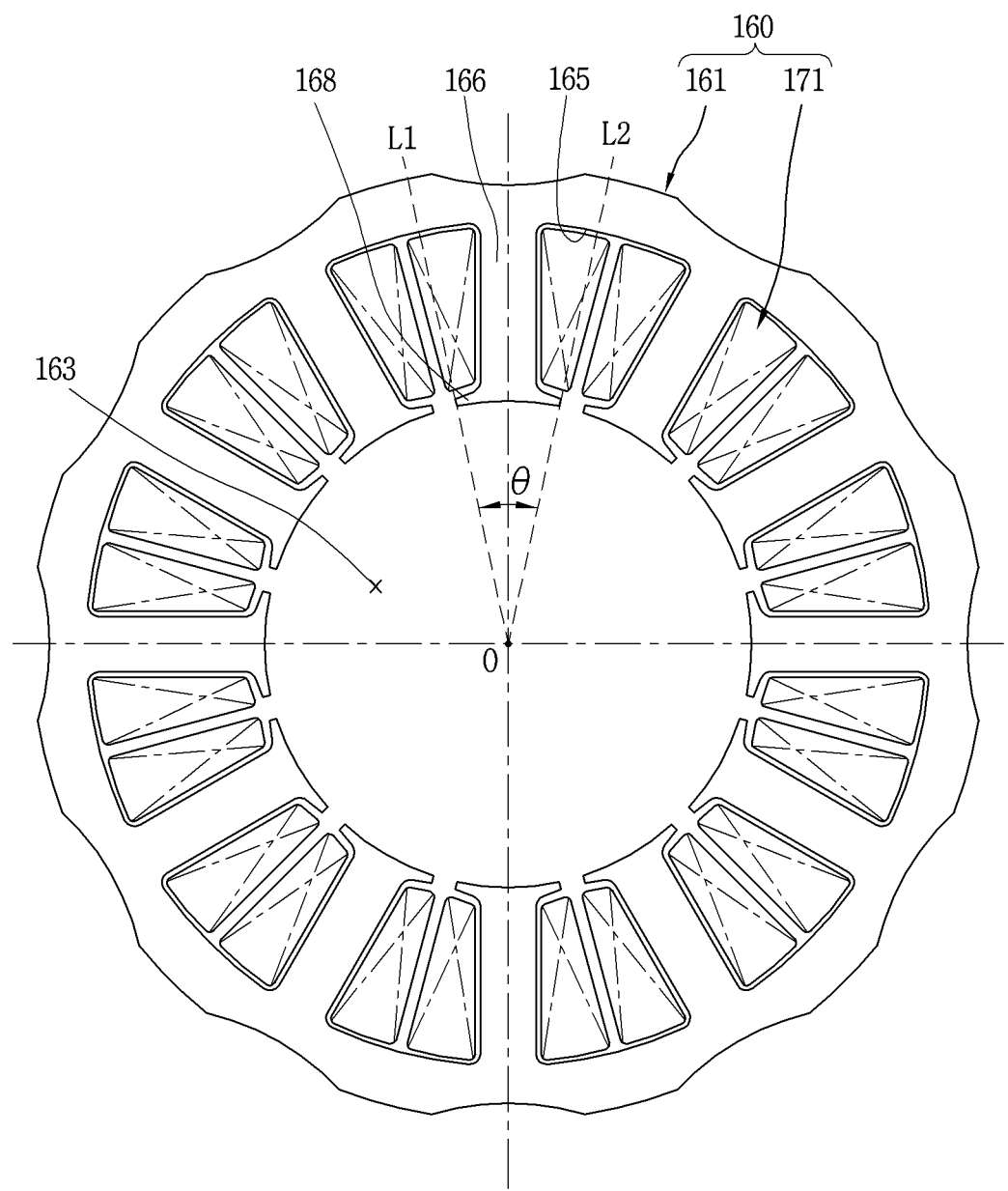
FIG. 3 is a planar view of the stator of FIG. 2.
Figure 4:
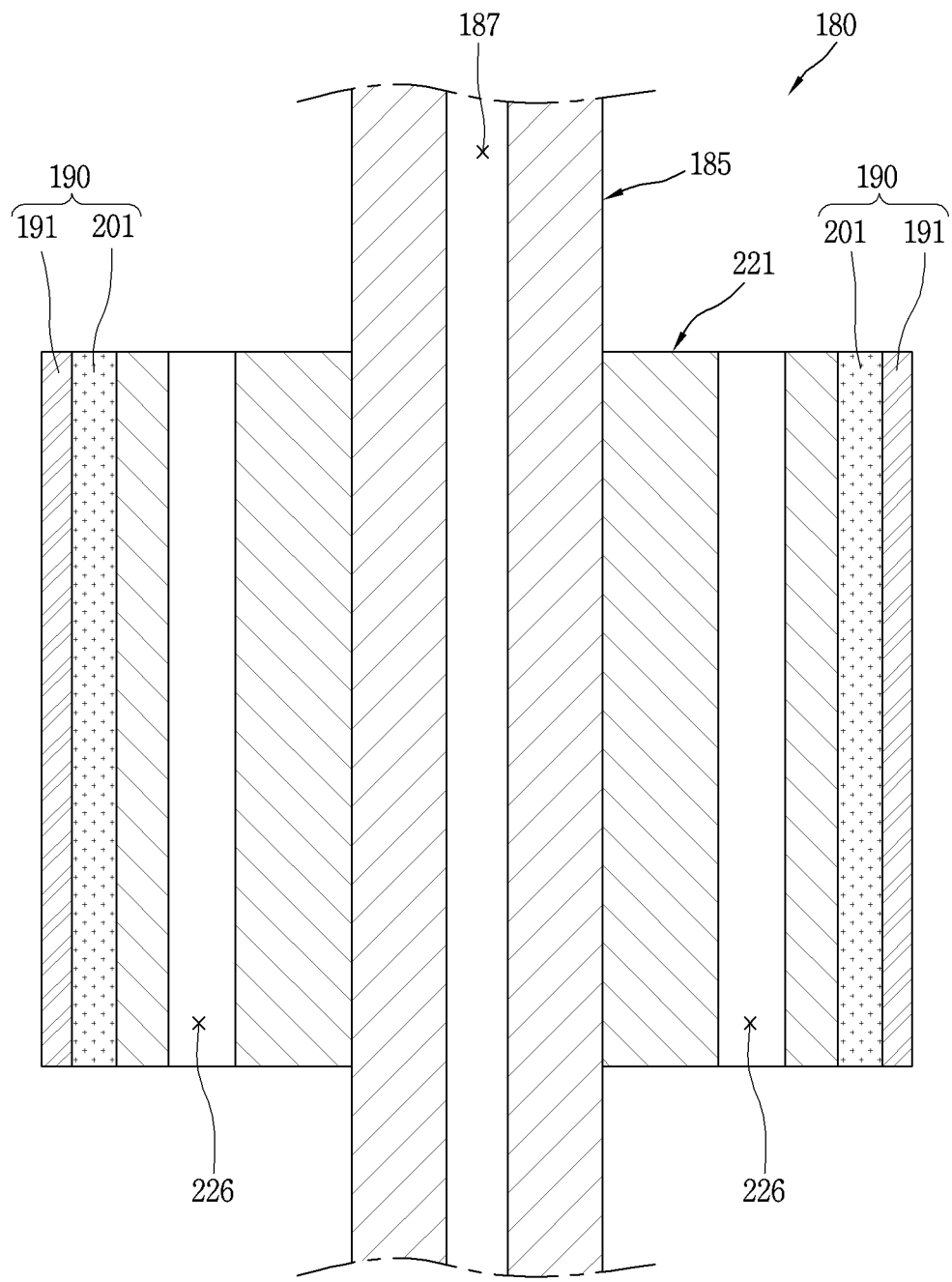
FIG. 4 is an exploded view of the rotor of FIG. 1.

FIG. 3 is a planar view of the stator of FIG. 2, and FIG. 4 is an enlarged view of the rotor of FIG. 1.

As illustrated in FIG. 3, the stator 160 may include a plurality of slots 165 and poles 166 provided along a circumference of the rotor receiving hole 163.

The plurality of slots 165 and poles 166 of the stator core 161 may be alternately arranged along a circumferential direction.

The plurality of slots 165 may be, for example, twelve in number.

The plurality of poles 166 may also be twelve in number.

Each of the poles 166 may be provided with a pole shoe (extending portion) 168 extending from a free end portion along the circumferential direction.

The pole shoe 168, for example, may be configured such that an internal angle θ between connecting lines L1 and L2 connecting a center O of the rotor receiving hole 163 with both ends of the pole shoe 168 may be in the range of 19° to 26°.

For example, the internal angle between the connecting lines L1 and L2 connecting the center O of the rotor receiving hole 163 with the both ends of the pole shoe 168 may be in the range of 19.8° to 25.2°.

As illustrated in FIG. 4, the rotor frame 221 may be provided in a region axially spaced apart from the eccentric portion 188 of the rotation shaft 185.

The rotor frame 221 may have a substantially (approximately) cylindrical shape.

The permanent magnet 190 may be provided on an outside of the rotor frame 221.

The permanent magnet 190 may include a first magnet 191 provided on an outer circumference of the rotor frame 221, and a second magnet 201 disposed at an inner side relative to an outer diameter surface of the first magnet 191.

Figure 5:
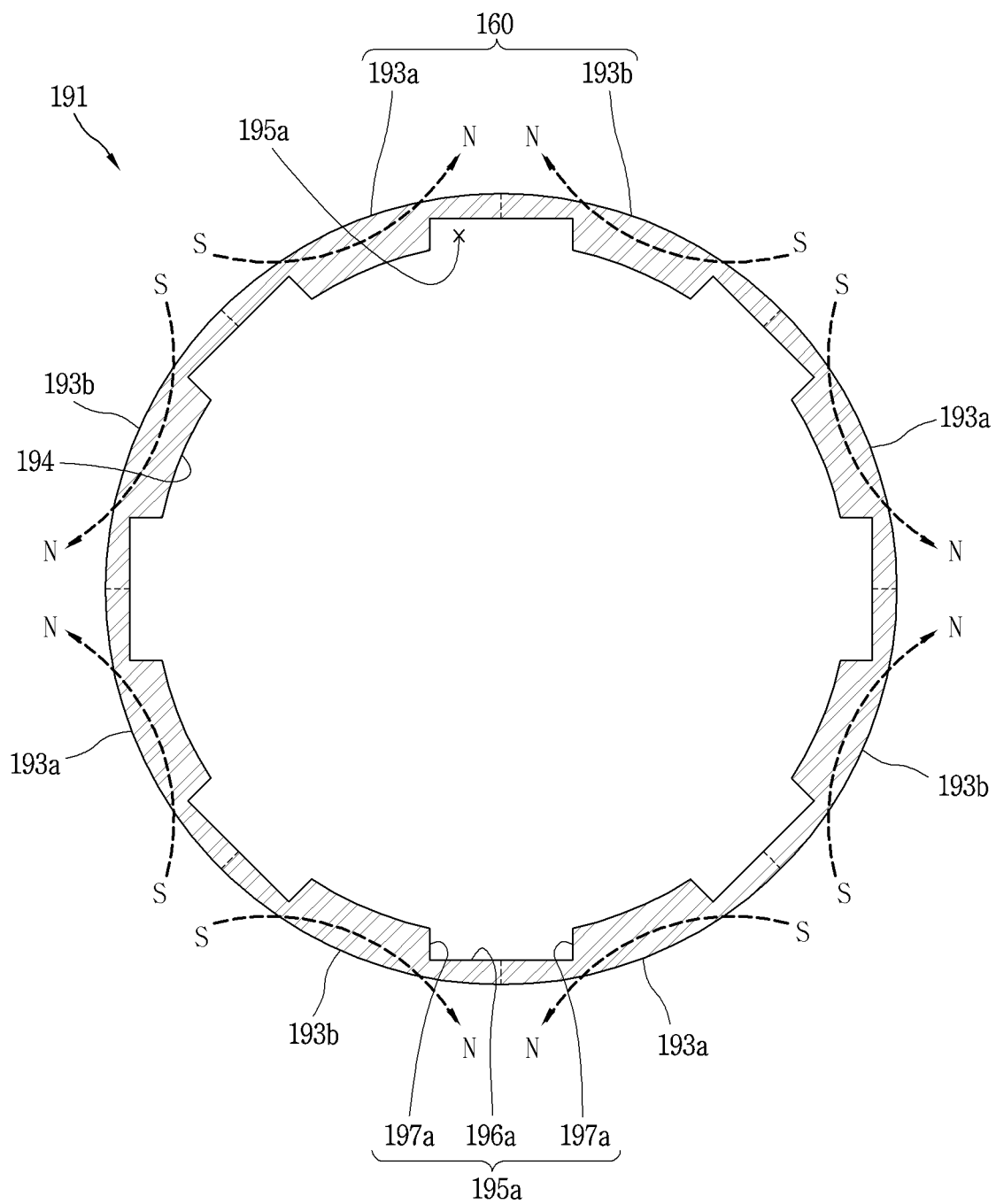
FIG. 5 is an enlarged view of an example first magnet of FIG. 2.
Figure 6:
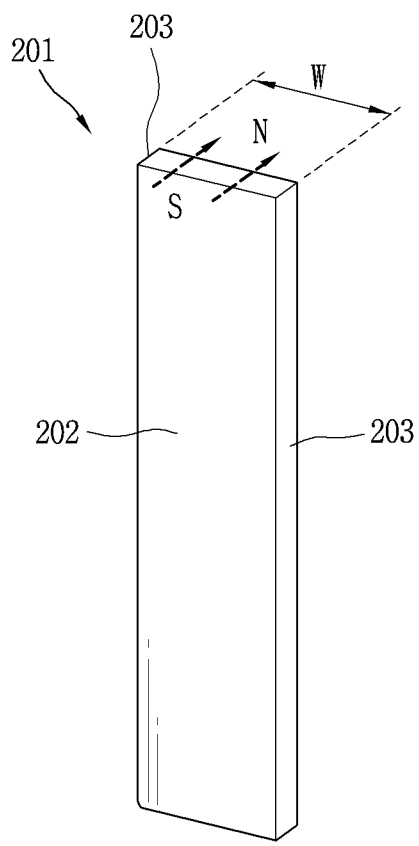
FIG. 6 is a perspective view of an example second magnet of FIG. 2.
Figure 7:
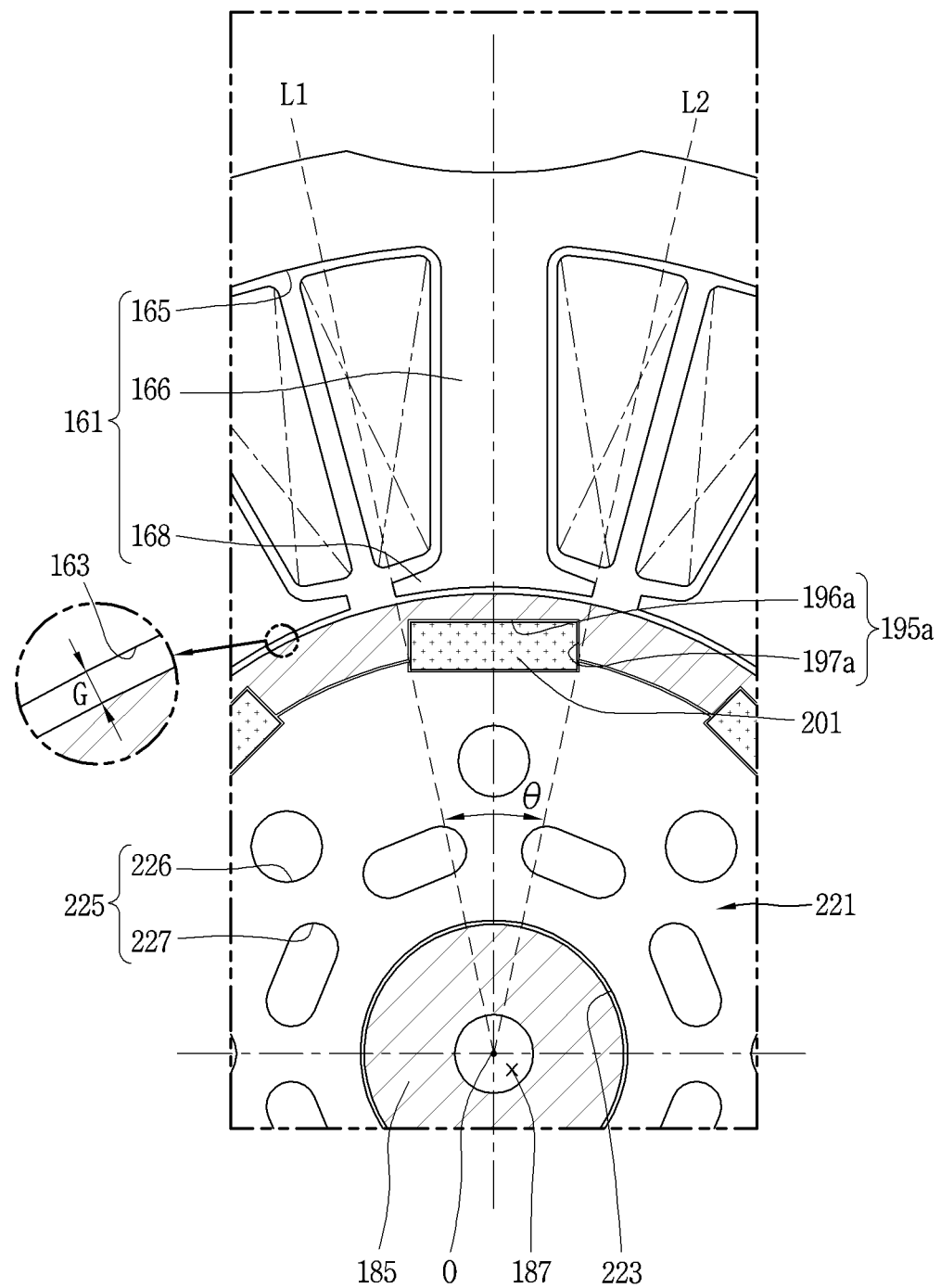
FIG. 7 is an enlarged view of an example pole shoe and an example second magnet region of FIG. 2.
Figure 9:
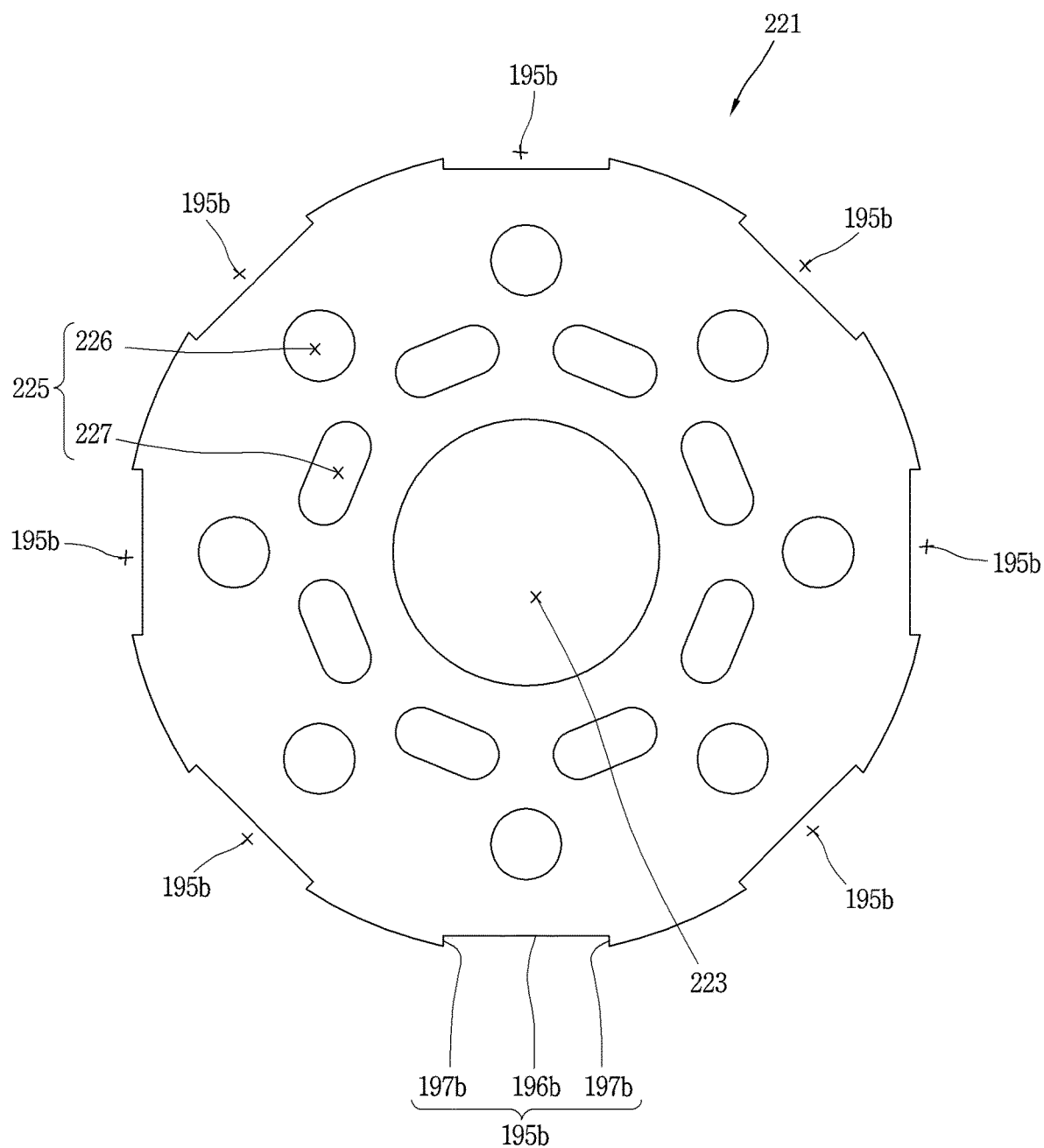
FIG. 9 is an enlarged view of an example rotor frame of FIG. 2.

FIG. 5 is an enlarged view of the first magnet of FIG. 2, FIG. 6 is a perspective view of the second magnet of FIG. 2, FIG. 7 is an enlarged view of the pole shoe and a second magnet region of FIG. 2, and FIG. 9 is an enlarged view of the rotor frame of FIG. 2.

As illustrated in FIG. 5, the first magnet 191 may be formed in a cylindrical shape, for example.

The first magnet 191 may be provided therein with a rotor frame contact portion 194 with which an outer surface of the rotor frame 221 is contactable.

For example, the first magnet 191 may be configured such that a plurality of magnetic poles (N-poles and S-poles) opposite to each other are alternately arranged along the circumferential direction.

The first magnet 191 may be configured to form a magnetic field in the gap G and not to form the magnetic field therein, for example.

For example, the first magnet 191 may be polar-anisotropically magnetized such that the magnetic field is formed in the gap G and is not formed therein.

The first magnet 191 may be configured to have, for example, eight poles.

The first magnet 191 may be provided with first magnetic pole portions 193a each having opposite magnetic poles formed at both end parts thereof along a first direction, and second magnetic pole portions 193b each having opposite magnetic poles formed at both end parts thereof in a direction opposite to the first direction.

For example, the first magnet 191 may include four first magnetic pole portions 193a and four second magnetic pole portions 193b.

Each of the first magnetic pole portions 193a, for example, may be configured such that an S-pole and an N-pole are arranged at both end parts thereof along a clockwise direction in the drawing.

Each of the second magnetic pole portions 193b, for example, may be configured such that an S-pole and an N-pole are arranged at both end parts thereof along a counterclockwise direction in the drawing.

The first magnetic pole portion 193a and the second magnetic pole portion 193b may be configured to have the same magnetic pole at a boundary region therebetween.

Accordingly, the first magnet 191 may have an N-pole or an S-pole at the boundary region between the first magnetic pole portion 193a and the second magnetic pole portion 193b.

The first magnet 191 may be configured as, for example, a bonded magnet.

This may result in facilitating a fabrication of the first magnet 191 and reducing a fabricating cost of the first magnet 191.

The first magnet 191 may be implemented as a neodymium (Nd) bonded magnet, for example.

The first magnet 191, for example, may be provided with second magnet inserting portions 195a so that the second magnets 201 can be inserted therein.

Each of the second magnet inserting portions 195a may be disposed such that a center thereof in the circumferential direction is located at a boundary between the first magnetic pole portion 193a and the second magnetic pole portion 193b.

The second magnet inserting portions 195a may be formed along a radial direction by being spaced apart from the outer diameter surface of the first magnet 191 by a preset distance.

In some examples, the preset distance from the outer surface of the first magnet 191 along the radial direction may be set such that a minimum thickness between the outer diameter surface of the first magnet 191 and the second magnet inserting portion 195a is greater than or equal to 1 mm.

In some examples, a minimum distance between the outer diameter surface of the first magnet 191 and the second magnet 201 may be greater than or equal to 1 mm.

The second magnet inserting portion 195a may be formed symmetrically based on a boundary line between the first magnetic pole portion 193a and the second magnetic pole portion 193b, for example.

The second magnet inserting portion 195a may be formed to be opened inward, for example.

The second magnet inserting portion 195a may have, for example, a rectangular shape opened inward.

The second magnet inserting portion 195a of the first magnet 191, for example, may include an outer contact portion 196a which is in contact with the outer surface of the second magnet 201, and side contact portions 197a which are in contact with both side surfaces of the second magnet 201.

Meanwhile, the second magnet 201 may have a rectangular parallelepiped shape as illustrated in FIG. 6.

Each of the second magnets 201 may have a rectangular cross section including, for example, both plate portions 202 arranged in parallel with each other and both side portions 203 arranged in parallel with each other.

The second magnet 201 may have a length corresponding to a length of the first magnet 191 in an axial length of the first magnet 191, for example.

The second magnet 201 may have a preset width W along the circumferential direction, for example.

In this implementation, the second magnet 201, as illustrated in FIG. 7, may have a size corresponding to a size of the pole shoe 168.

The internal angle θ between the connecting lines L1 and L2 connecting the both ends of the second magnet 201 with the center O of the rotor 180 is in the range of 19° to 26°.

For example, the internal angle θ between the connecting lines L1 and L2 connecting the both ends of the second magnet 201 with the center of the rotor 180 may be set in the range of 19.8° to 25.2°.

Figure 8:
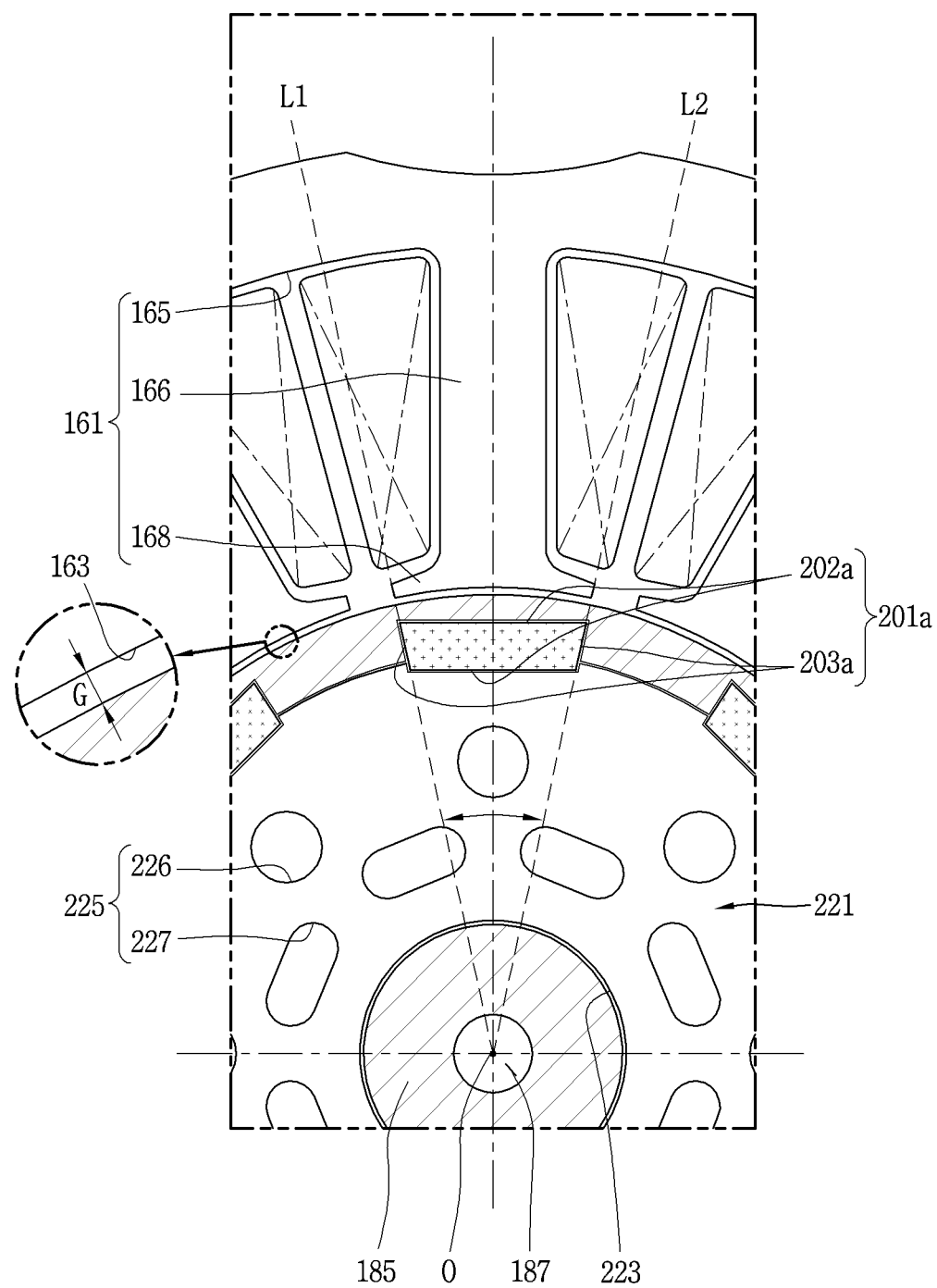
FIG. 8 is an enlarged view of the second magnet of FIG. 2.

This implementation illustrates an example in which the second magnet 201 has a rectangular cross section such that inner edges of both end portions (e.g., the both side portions 203) in the circumferential direction are in contact with the respective connecting lines L1 and L2 connecting the both end portions 203 of the second magnet 201 with the center of the rotor 180. In some examples, as illustrated in FIG. 8, the second magnet 201a may have a rectangular cross section having both plate portions 202a in parallel with each other and both side portions 203a inclined with respect to the plate portions 202a along the circumferential direction to be in contact with the connecting lines L1 and L2. For instance, a cross sectional shape of the second magnet 201a may be trapezoidal.

The width W of the second magnet 201 along the circumferential direction may be smaller than a width of the pole shoe 168 along the circumferential direction.

The second magnet 201 may be magnetized in a thickness direction, for example.

Accordingly, each of the second magnets 201 may have opposite magnetic poles (N-pole and S-pole) on both plate portions in the thickness direction.

The second magnet 201 may have a stronger magnetic flux than the first magnet 191.

The second magnet 201 may be configured as, for example, a sintered magnet.

The second magnet 201 may be implemented as a neodymium (Nd) sintered magnet, for example.

The permanent magnet 190 of this implementation may be configured such that a whole magnetic flux is formed by the first magnet 191, which is implemented as the bonded magnet having the cylindrical shape and disposed in the gap by being polar-anisotropically magnetized to form a magnetic field on the outer surface, and a main magnetic flux is increased by the second magnet 201, which is disposed in a center of magnetic poles of the first magnet 191 and configured as the sintered magnet having the stronger magnetic flux relative to the first magnet 191.

This may result in reducing a total magnet material cost of the permanent magnet 190.

Also, an output of the electric motor 150 can be improved owing to the increased main magnetic flux by the second magnet 201.

In addition, as the main magnetic flux is increased by the second magnet 201, magnetic flux density of the gap G may obtain a sinusoidal shape. Accordingly, cogging torque can be reduced and vibration and noise caused by the cogging torque can be prevented.

In addition, since the second magnet 201 can increase the magnetic flux of an outer section of the relatively thin second magnet inserting portion 195a, which may contribute to improving demagnetization endurance reliability of the outer section of the second magnet inserting portion 195a.

On the other hand, for example, one region of the second magnet 201 may be in surface-contact with the rotor frame 221.

For example, as illustrated in FIG. 9, the rotor frame 221 may be provided with second magnet inserting portions 195b each forming an insertion space, in which the second magnet 201 is inserted, in cooperation with the first magnet 191.

The second magnet inserting portion 195b of the rotor frame 221, for example, may include an inner contact portion 196b that is in surface-contact with an inner surface of the second magnet 201.

The second magnet inserting portion 195b of the rotor frame 221 may include side contact portions 197b which are in contact with both side surfaces of the second magnet 201, for example.

The rotor frame 221 may be provided at its center with a rotation shaft hole 223 in which the rotation shaft 185 can be inserted.

Since the first magnet 191 is polar-anisotropically magnetized, the rotor frame 221 does not have to form a flux path, which may facilitate the fabrication of the rotor frame 221.

For example, since the rotor frame 221 is not subjected to the magnetic field of the first magnet 191, shape, material, and size of the rotor frame 221 may be more variously selectable, and thus the design of the rotor frame 221 can be facilitated.

For example, the rotor frame 221 may be formed of a non-magnetic material.

The rotor frame 221 may be made of, for example, a lightweight non-magnetic material.

Accordingly, a mass of the rotor frame 221 can be reduced, so that a stop and start control can be facilitated.

For example, the rotor frame 221 may alternatively be configured as a synthetic resin member.

As another example, the rotor frame 221 may be formed of the same material as the rotation shaft 185.

The rotor frame 221 may be integrally formed with the rotation shaft 185, for example.

This may further facilitate the fabrication of the rotor frame 221 and the rotation shaft 185.

The rotor frame 221 may be formed by, for example, stacking electric steel plates (not illustrated) in an insulating manner.

The rotor frame 221 may be provided with a penetrating part 225 penetrating therethrough along the axial direction.

As a result, a fluid (for example, gas and liquid) filled in the upper and lower side of the rotor frame 221 can be freely moved up and down.

In addition, the penetrating part 225 may increase a surface area of the rotor frame 221, so as to facilitate cooling of the rotor frame 221.

In addition, the penetrating part 225 may reduce the mass of the rotor frame 2010, so as to reduce a weight of the rotor 180.

This may result in further facilitating the start and stop control.

The penetrating part 225 may be provided with first penetrating portions 226 formed at an inner side of the second magnet 201, for example.

The first penetration portions 226 may be, for example, eight in number.

Each of the first penetrating portions 226 may have, for example, a circular cross section with a preset diameter.

The first penetrating portions 226 may be formed at inner sides of the second magnet inserting portions 195b in a corresponding manner, for example.

Thus, a temperature rise of the region of the second magnet 201 can be prevented.

The penetration part 225 may be provided with second penetrating portions 227 provided around the rotation shaft hole 223, for example.

The second penetrating portions 227 may be disposed, for example, between the adjacent first penetrating portions 226.

Each of the second penetrating portions 227 may be implemented as, for example, a long hole having a long length along the circumferential direction.

The second penetrating portions 227 may be, for example, eight in number.

Figure 10:
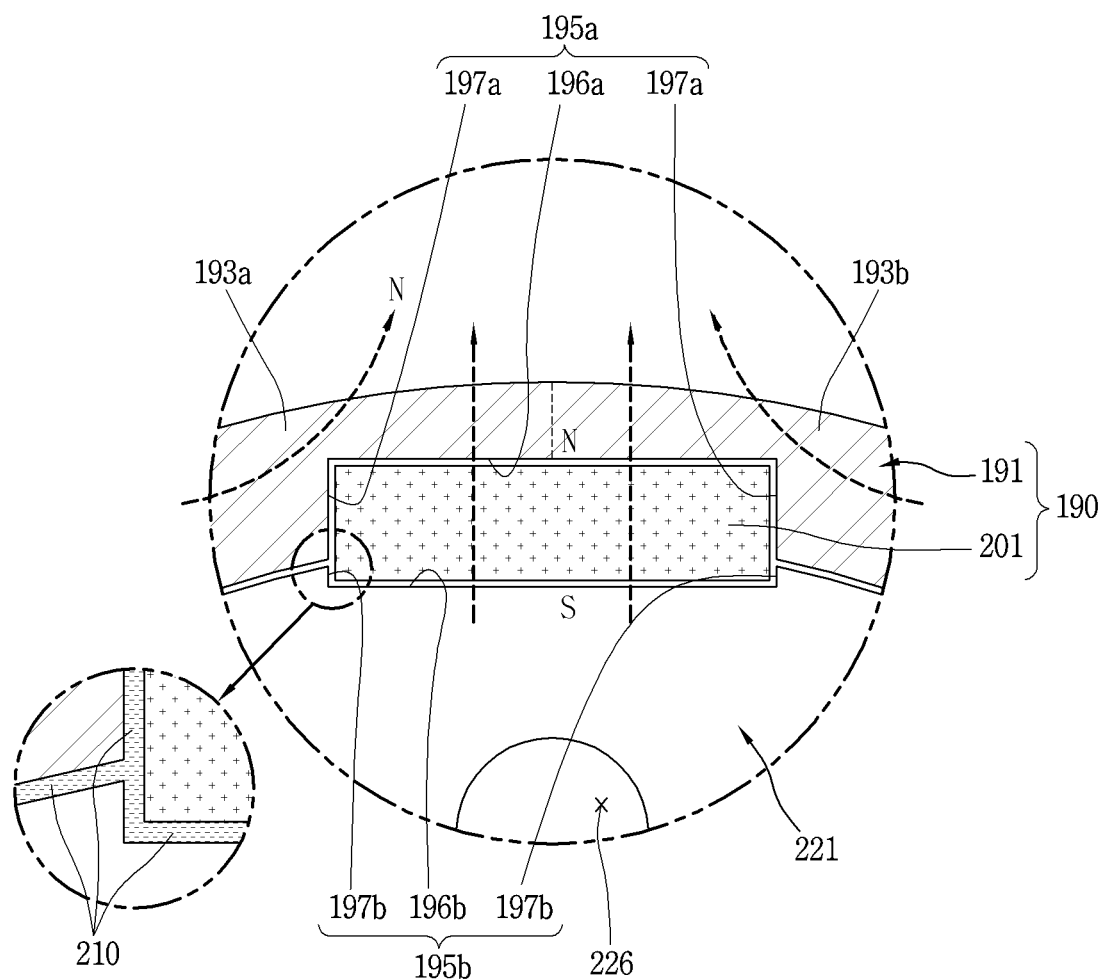
FIG. 10 is an enlarged view of an example coupling region between the first magnet and the second magnet of FIG. 2.
Figure 11:
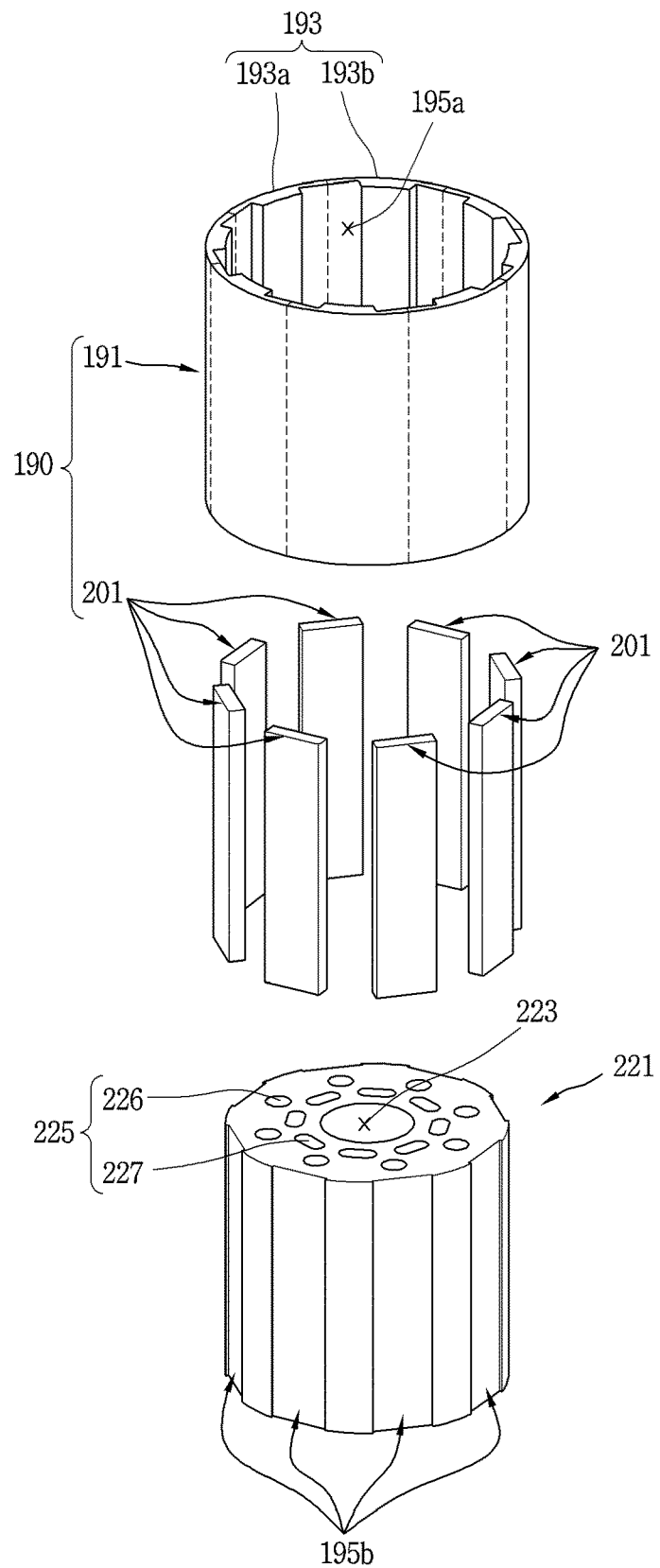
FIG. 11 is a perspective of the rotor of FIG. 1 before coupling.

FIG. 10 is an enlarged view of an example coupling region between the first magnet 191 and the second magnet 201 of FIG. 2, and FIG. 11 is a perspective view of the rotor of FIG. 1 before coupling.

As illustrated in FIG. 10, the second magnet 201 may be disposed to correspond to the magnetic pole of the first magnet 191.

Since the first magnetic pole portion 193a and the second magnetic pole portion 193b have the same magnetic pole at the boundary region therebetween, the second magnet 201 may be inserted into the second magnet inserting portion 195a to correspond to the magnetic pole of the second magnet inserting portion 195a, which is formed at the boundary region between the first magnetic pole portion 193a and the second magnetic pole portion 193b.

For example, when a magnetic pole of a right end part of the first magnetic pole portion 193a in the drawing is an N-pole, a magnetic pole of a left end part of the second magnetic pole portion 193b is also an N-pole. Thus, the second magnet 201 can be inserted into the second magnet inserting portion 195a such that an outer surface thereof has the N-pole.

Accordingly, a center of each magnetic pole (N-pole, S-pole) of the rotor 180 can be formed at the boundary region between the first magnetic pole portion 193a and the second magnetic pole portion 193b of the first magnet 191.

With this configuration, the magnetic flux density of the gap G becomes maximum at the center of each magnetic pole of the rotor 180 and gradually decreases when passing the center of each magnetic pole (N-pole, S-pole) so as to become minimum at the center of each magnetic pole portion 193, thereby forming a sinusoidal shape.

This may result in reducing the cogging torque, and preventing the generation of vibration and noise due to the cogging torque.

In addition, the electric motor 150 of this implementation can obtain an improved output (counter electromotive force) owing to an increased main magnetic flux by the second magnet 201 at the center of each magnetic pole (N-pole, S-pole) of the rotor 180.

In some implementations, as illustrated in FIG. 11, the first magnet 191 is coupled to the circumference of the rotor frame 221 and the second magnets 201 may be inserted into the respective second magnet inserting portions 195a and 195b, which are formed between the rotor frame 221 and the first magnet 191.

The second magnets 201 may be inserted into the second magnet inserting portions 195a and 195b, respectively, along the axial direction.

Referring back to FIG. 10, for example, an adhesive 210 may be applied to an area where the rotor frame 221 and the first magnet 191 are in contact with each other.

For example, the adhesive 210 may be applied to an area where the second magnet 201 and the second magnet inserting portions 195a and 195b are in contact with each other.

This implementation illustrates that the rotor frame 221, the first magnet 191 and the second magnet 201 are respectively formed and the rotor frame 221, the first magnet 191 and the second magnet 201 are coupled together by the adhesive 210. However, alternatively, the second magnets 201 may be coupled to the outer surface of the rotor frame 221 and the first magnet 191 may be formed in an injecting manner on an outer surface of a coupled body of the rotor frame 221 and the second magnets 201.

With the configuration, the roller 135 may be coupled to the eccentric portion 188 of the rotation shaft 185 and the main bearing 137 and the sub bearing 139 may be coupled to both sides of the rotation shaft 185.

The rotor frame 221 may be coupled to another area of the rotation shaft 185 and the first magnet 191 and the second magnet 201 may be coupled to the outer surface of the rotor frame 221, respectively.

When an operation is started and power is applied to the stator coil 171, the rotor 180 may be rotated centering on the rotation shaft 185 in response to an interaction between a magnetic field formed by the stator coil 171 and a magnetic field of the permanent magnets 190.

At this time, in the rotor 180 of this implementation, since the main magnetic flux is increased by the second magnet 201, the magnetic flux density of the gap G has the sinusoidal shape. Thus, the cogging torque can be reduced and the generation of vibration and noise caused due to the cogging torque can be prevented.

Further, the output (the counter electromotive force) of the rotor 180 can be increased owing to the increased main magnetic flux by the second magnet 201.

When the rotor 180 rotates, the roller 135 eccentrically moves inside the cylinder 131, and accordingly the refrigerant may be sucked into the cylinder 131 through the suction pipe 117 and compressed in the cylinder 131.

The refrigerant compressed in the cylinder 131 may be discharged to the outside of the case 110 through the discharge pipe 119 and circulated along a refrigerant pipe of a refrigeration cycle.

Figure 12:
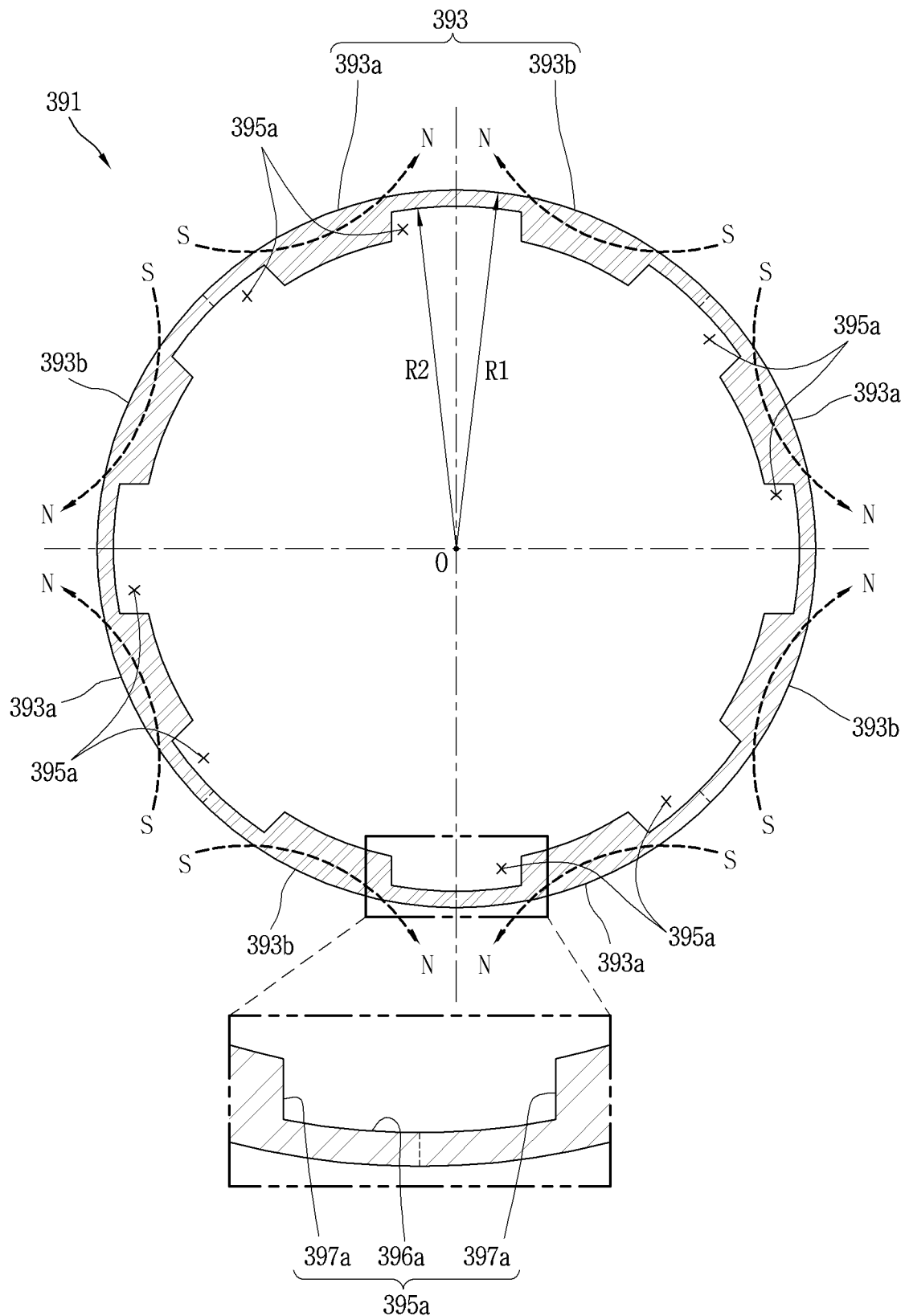
FIG. 12 is an enlarged view of an example of the first magnet of FIG. 2.
Figure 13:
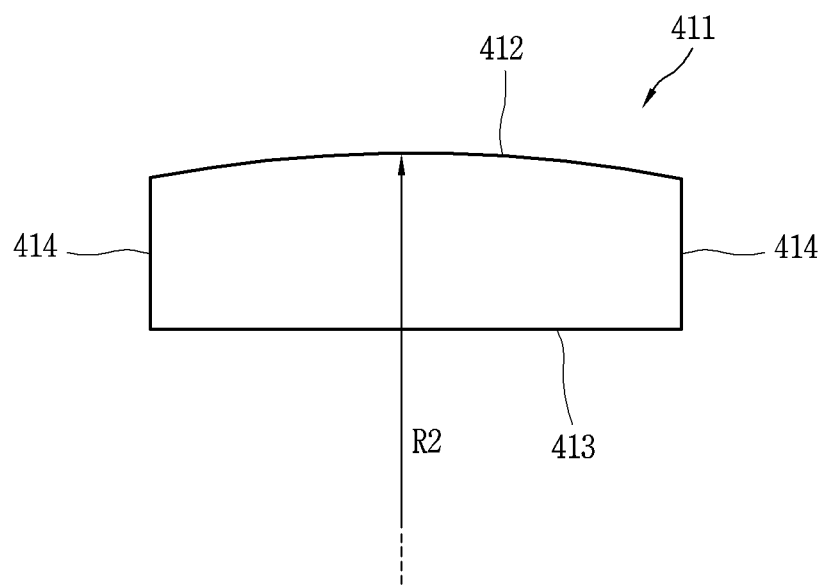
FIG. 13 is an enlarged view of an example of the second magnet of FIG. 2.

FIG. 12 is an enlarged view of an example first magnet of FIG. 2 in accordance with a third implementation, and FIG. 13 is an enlarged view of an example second magnet of FIG. 2 in accordance with the third implementation.

A first magnet 391 may have a substantially cylindrical shape as illustrated in FIG. 12.

The first magnet 391 may be configured as, for example, a bonded magnet.

For example, the first magnet 391 may be implemented as a neodymium (Nd) bonded magnet.

The first magnet 391 may be configured such that a plurality of opposite magnetic poles (N-poles and S-poles) is alternately arranged along a circumferential direction.

The first magnet 391 may be configured to have, for example, eight poles.

For example, the first magnet 391 may be configured such that a magnetic field is formed in the gap G but is not formed therein.

The first magnet 391 may be polar-anisotropically magnetized so that the magnetic field is formed only in the gap G, for example.

The first magnet 391, for example, may include first magnetic pole portions 393a each having opposite magnetic forces (N-pole and S-pole) formed on both end parts thereof along a first direction, and second magnetic pole portions 393b each having opposite magnetic poles on both end parts thereof in an opposite direction to the first direction.

For example, the first magnet 391 may be segmented into eight sections along the circumferential direction, and each section may be polar-anisotropically magnetized such that opposite magnetic poles (N-pole and S-pole) are formed on both end parts thereof.

The first magnet 391 may include, for example, four first magnetic pole portions 393a and four second magnetic pole portions 393b.

Each of the first magnetic pole portions 393a may be polar-anisotropically magnetized, for example, such that an S-pole is formed at a left end part and an N-pole is formed at a right end part along the first direction (a clockwise direction in the drawing).

Each of the second magnetic pole portions 393b may be polar-anisotropically magnetized, for example, such that the N-pole is formed at a left end part and the S-pole is formed at a right end part in an opposite direction to the first direction.

Meanwhile, each of second magnets 411 may allow the first magnet 391 to have a strong magnetic flux.

The second magnet 411 may be configured as a sintered magnet.

For example, the second magnet 411 may be implemented as a neodymium (Nd) sintered magnet.

The second magnet 411 may be spaced apart from the gap G toward the rotation shaft 385 relative to an outer diameter surface of the first magnet 391.

For example, the electric motor 150 having the permanent magnet according to this implementation may be configured such that a whole magnetic field is formed by the first magnet 391, which is formed of the bonded magnet into the cylindrical shape and polar-anisotropically magnetized, and a main magnetic flux is increased by the second magnet 411, which is formed of the sintered magnet having the stronger magnetic flux than the first magnet 391 into a bar-like shape, thereby reducing an entire material cost of the permanent magnet 390.

Further, the main magnetic flux may be increased by the second magnet and thus counter electromotive force can be increased, thereby improving an entire output.

Further, in response to the increase in the main magnetic flux by the second magnet 411, the magnetic flux density in the gap G may have a sinusoidal shape. Accordingly, the cogging torque can be reduced, and a generation of vibration and noise due to the cogging torque can be suppressed.

In some implementations, the second magnet 411 may be as close to the gap G as possible so that the main magnetic flux (the counter electromotive force) can be increased.

As the second magnet 411 is closer to the gap G, an area where the first magnet 391 is coupled to the second magnet 411 may have a reduced thickness. This causes support strength to be insufficient, and is likely to cause a thickness-reduced area of the first magnet 391 to be cracked and/or damaged.

To this end, the first magnet 391 may be provided with second magnet inserting portions 395a in which the second magnets 211 can be inserted. Each of the second magnet inserting portions 395a may be inwardly spaced apart from an outer diameter surface of the first magnet 391 with a preset distance therebetween.

Here, the preset distance may be set in a manner that a minimum thickness between the outer diameter surface of the first magnet 391 and the second magnet inserting portion 395a is as thin as preventing crack or damage of the first magnet 391.

The minimum thickness between the outer diameter surface of the first magnet 391 and the second magnet inserting portion 395a may be greater than or equal to 1 mm, for instance.

With regard to this point, in order to suppress the occurrence of damage due to the reduced thickness of the first magnet 391, the thickness of the second magnet 411 may gradually decrease from the center toward both end portions of the second magnet 411.

Accordingly, the first magnet 391 can prevent a generation of a specific area where a thickness of the second magnet inserting portion 395a, to which the second magnet 411 is coupled, specifically becomes smaller than that of a surrounding, which may result in preventing the specific area from being cracked or damaged due to the reduced thickness of the first magnet 391.

The second magnet 411 may have a length (a length in an axial direction) corresponding to a length of the first magnet 391 in an axial direction.

The second magnet 411 may be configured to have, for example, a substantially rectangular parallelepiped shape.

As illustrated in FIG. 13, the second magnet 411 may be provided with an outer surface portion 412 corresponding to an outer shape of the first magnet 391.

The second magnet 411 may be provided with, for example, a curved outer surface portion 412, a linear inner surface portion 413, and both linear side surface portions 414.

The outer surface portion 412 of the second magnet 411 may be formed in an arcuate shape having a preset radius R2, for example.

Here, the preset radius R2 may be set in a manner of having a predetermined reduced size relative to a radius R1 of the first magnet 391 and having the same center as that of the radius R1 of the first magnet 391.

In correspondence with this, the first magnet 391 may be provided with second magnet inserting portions 395a in which the second magnets 411 are inserted therein, respectively.

Referring back to FIG. 12, each of the second magnet inserting portions 395a may be formed to be opened inward along a radial direction.

The second magnet inserting portion 395a may be provided with an outer contact portion 396a which is in surface-contact with the outer surface portion 412 of the second magnet 411, and side contact portions 397a which are in contact with both side surface portions 414 of the second magnet 411.

The outer contact portion 396a of the second magnet inserting portion 395a may be formed in an arcuate shape having a radius R2 corresponding to the radius R2 of the outer surface portion 412a of the second magnet 411.

The outer surface portion 412 of the second magnet 411 and the outer contact portion 396a of the second magnet inserting portion 395a may have the same radius R2 but differently-set assembly tolerances.

For example, for example, the outer surface portion 412 of the second magnet 411 may have a negative (−) tolerance, and the outer contact portion 396a of the second magnet inserting portion 395a may have a positive (+) tolerance.

With this configuration, a thickness between the outer contact portion 396a of the second magnet inserting portion 395a and the outer diameter surface of the first magnet 391 may be made constant.

This may make it possible to prevent a generation of a narrow section, in which a distance between the outer diameter surface of the first magnet 391 and the second magnet inserting portion 395a is narrow, and prevent the first magnet 391 from being cracked and damaged due to concentration of stress on the narrow section.

In addition, the second magnet 411 can increase the magnetic flux of an outer section, which is relatively thin, of the second magnet inserting portion 395a. This may result in contributing to improving demagnetization endurance reliability of the outer section of the second magnet inserting portion 395a.

The second magnet inserting portion 395a, for example, may be configured such that its center is located at a boundary between the first magnetic pole portion 393a and the second magnetic pole portion 393b of the first magnet 391.

The second magnet inserting portion 395a may be symmetrically formed based on the boundary between the first magnetic pole portion 393a and the second magnetic pole portion 393b.

Figure 14:
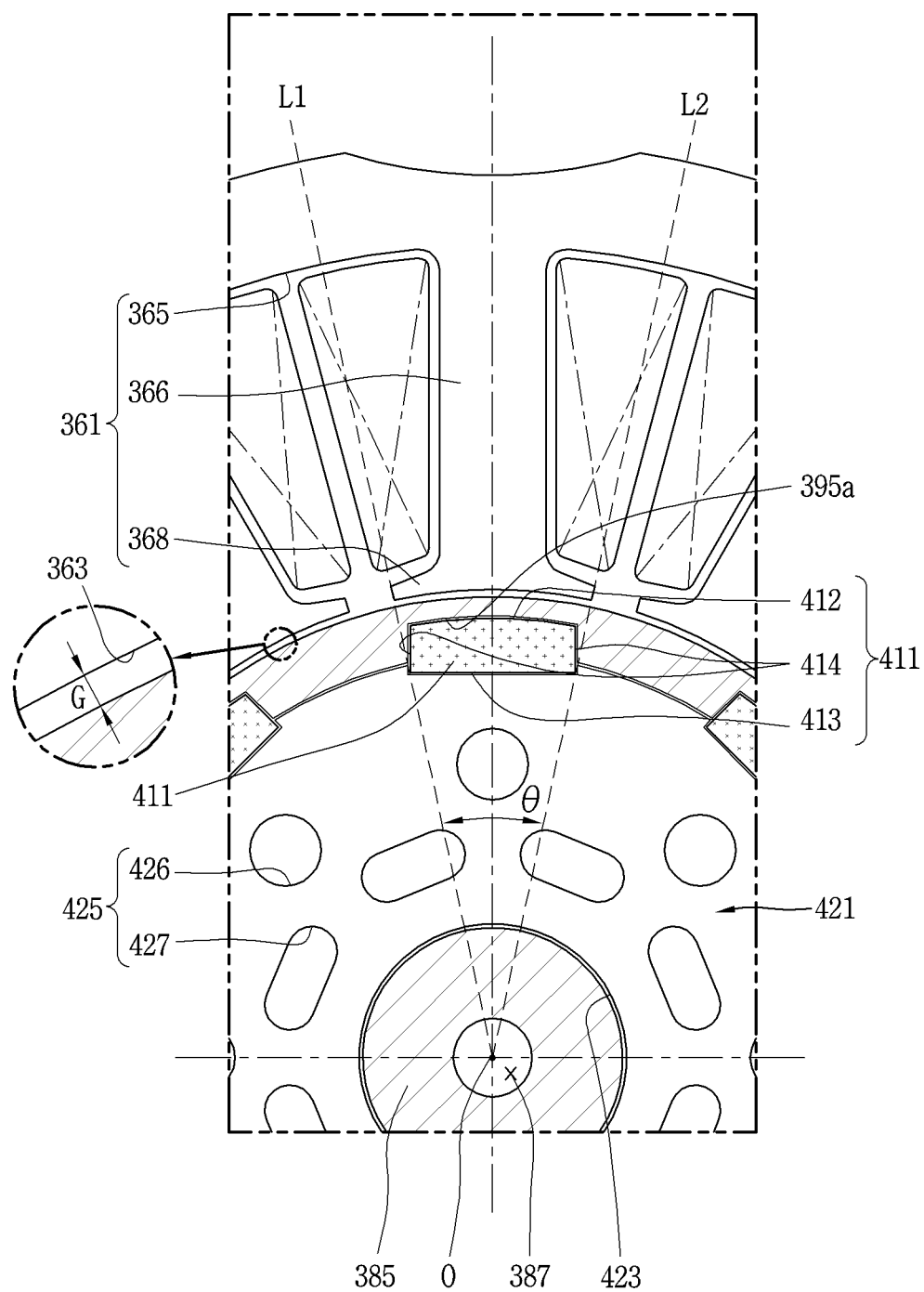
FIG. 14 is an enlarged view of an example main part of the first and second magnets of FIG. 2.
Figure 15:
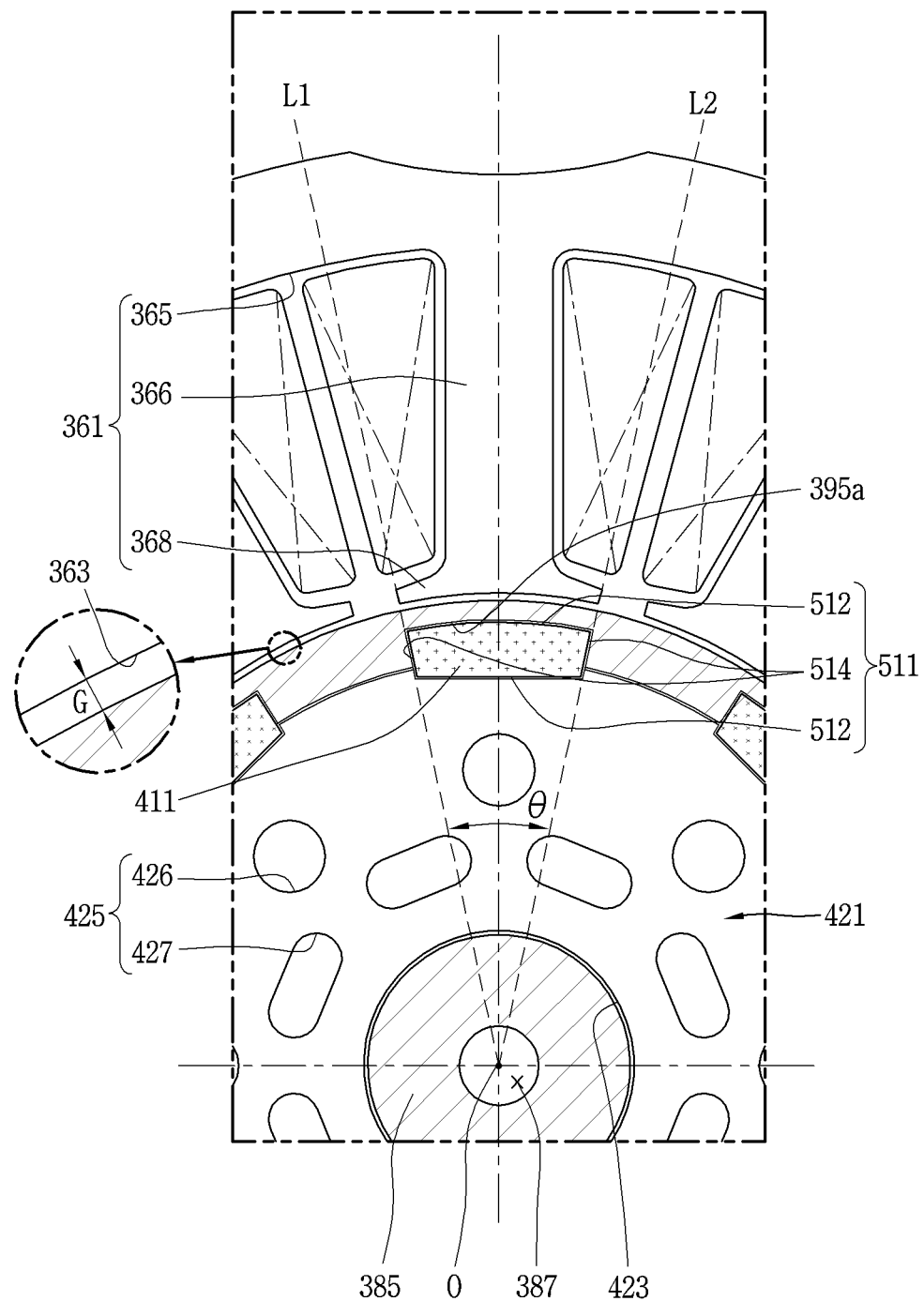
FIG. 15 is an enlarged view of an example of the second magnet of FIG. 14.

FIG. 14 is an enlarged view of an example main part of the first and second magnets of FIG. 2 in accordance with the third implementation, and FIG. 15 is an enlarged view of the second magnet of FIG. 14 in accordance with a fourth implementation.

As illustrated in FIG. 14, the second magnet 411 may have a size corresponding to a size of a pole shoe 368 of a stator 360.

For example, the second magnet 411 may be configured such that an internal angle θ between connecting lines L1 and L2 connecting both edges of the inner surface portion 413 and a center of a rotor receiving hole 363 is in the range of 19.8° to 25.2°.

In this implementation, the second magnet 411 may have a shape in which both corners of the outer surface portion 412 are inwardly spaced apart from the connecting lines L1 and L2 without being in contact with the connecting lines L1 and L2. However, this is merely illustrative. As illustrated in FIG. 15, a second magnet 511 may alternatively be configured to have inclined side surface portions 514 which are in parallel to the connecting lines L1 and L2 connecting the center O of the rotor receiving hole 363 with both end parts of the pole shoe 368.

Figure 16:
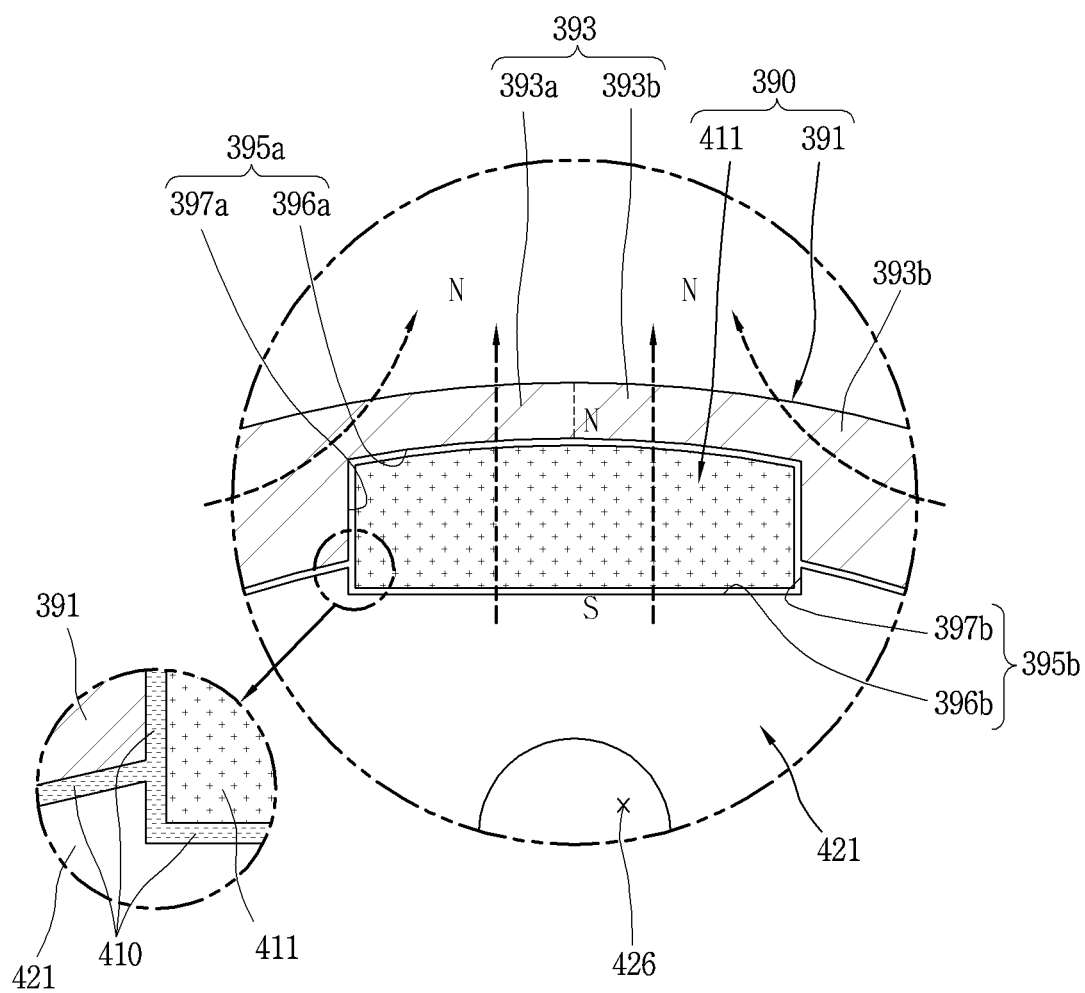
FIG. 16 is an enlarged view of an example coupling region between the first magnet and the second magnet of FIG. 2.

FIG. 16 is an enlarged view of an example coupling region between the first magnet and the second magnet of FIG. 2 in accordance with the third implementation.

As illustrated in FIG. 16, the second magnet 411 may be inserted into the second magnet inserting portions 395a and 395b formed between the first magnet 391 and the rotor frame 421.

The second magnet 411 may be magnetized to have the same magnetic pole (N-pole, S-pole) as the magnetic pole (N-pole, S-pole) formed by the first magnetic pole portion 393a and the second magnetic pole portion 393b.

For example, when a right end part of the first magnetic pole portion 393a of the first magnet 391 has the N-pole, a left end part of the second magnetic pole portion 393b also has the N-pole.

At this time, the second magnet 411 may be magnetized along the thickness direction so that the outer surface portion 412 has the N-pole and the inner surface portion 412 has the S-pole.

In contrast, when the right end part of the first magnetic pole portion 393a of the first magnet 391 has the S-pole, the left end part of the second magnetic pole portion 393b also has the S-pole. Therefore, the second magnet 211 may be magnetized along the thickness direction such that the outer surface portion 412 has the S-pole and the inner surface portion 413 has the N-pole.

With this configuration, the roller 335 may be coupled to the eccentric portion 388 of the rotation shaft 385, so as to be accommodated in the cylinder 331.

The main bearing 337 and the sub bearing 339 may be coupled to upper and lower sides of the cylinder 331, respectively.

Each of the first magnet 391 and the second magnet 411 may be coupled to the rotor frame 421 of the rotation shaft 385.

Here, an adhesive 410 may be appropriately applied to a contact area of the first magnet 391, the second magnet 411, and the rotor frame 421.

On the other hand, when an operation is started and power is applied to the stator coil 371, the rotor 380 may be rotated centering on the rotation shaft 385a by interaction between a magnetic field formed by the stator coil 371 and a magnetic field formed by the permanent magnet 390.

When the rotor 380 is rotated, the roller 135 may eccentrically move in the cylinder 131. Accordingly, a refrigerant may be sucked into the cylinder 131 through the suction pipe 117 and then compressed in the cylinder 131 to be discharged to the outside of the cylinder 131.

The compressed refrigerant may be discharged to the outside of the case 110 through the discharge pipe 119 and circulated along the refrigerant pipe of the refrigeration cycle.

Figure 17:
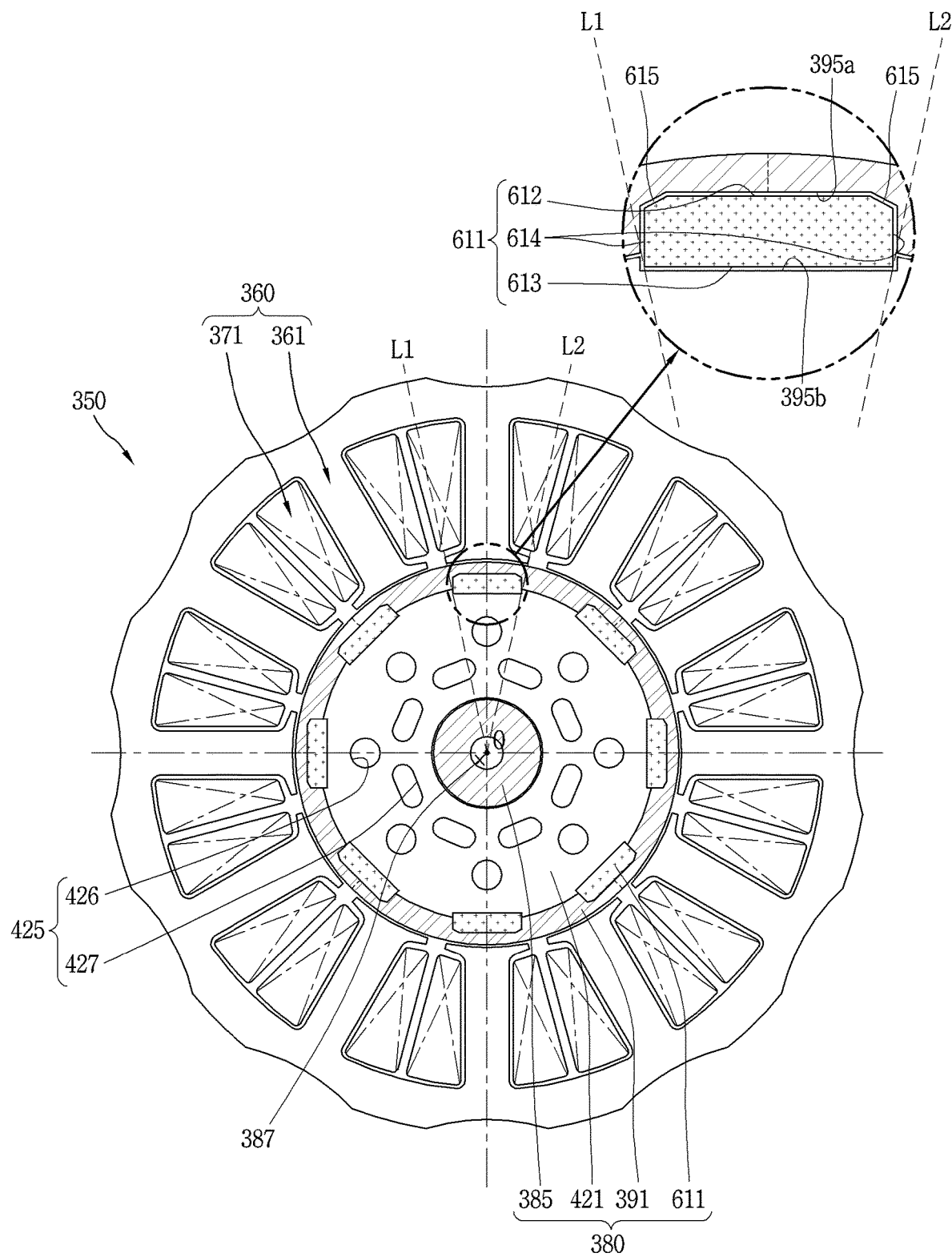
FIG. 17 is a planar view of an example stator and an example rotor of an example electric motor.
Figure 18:
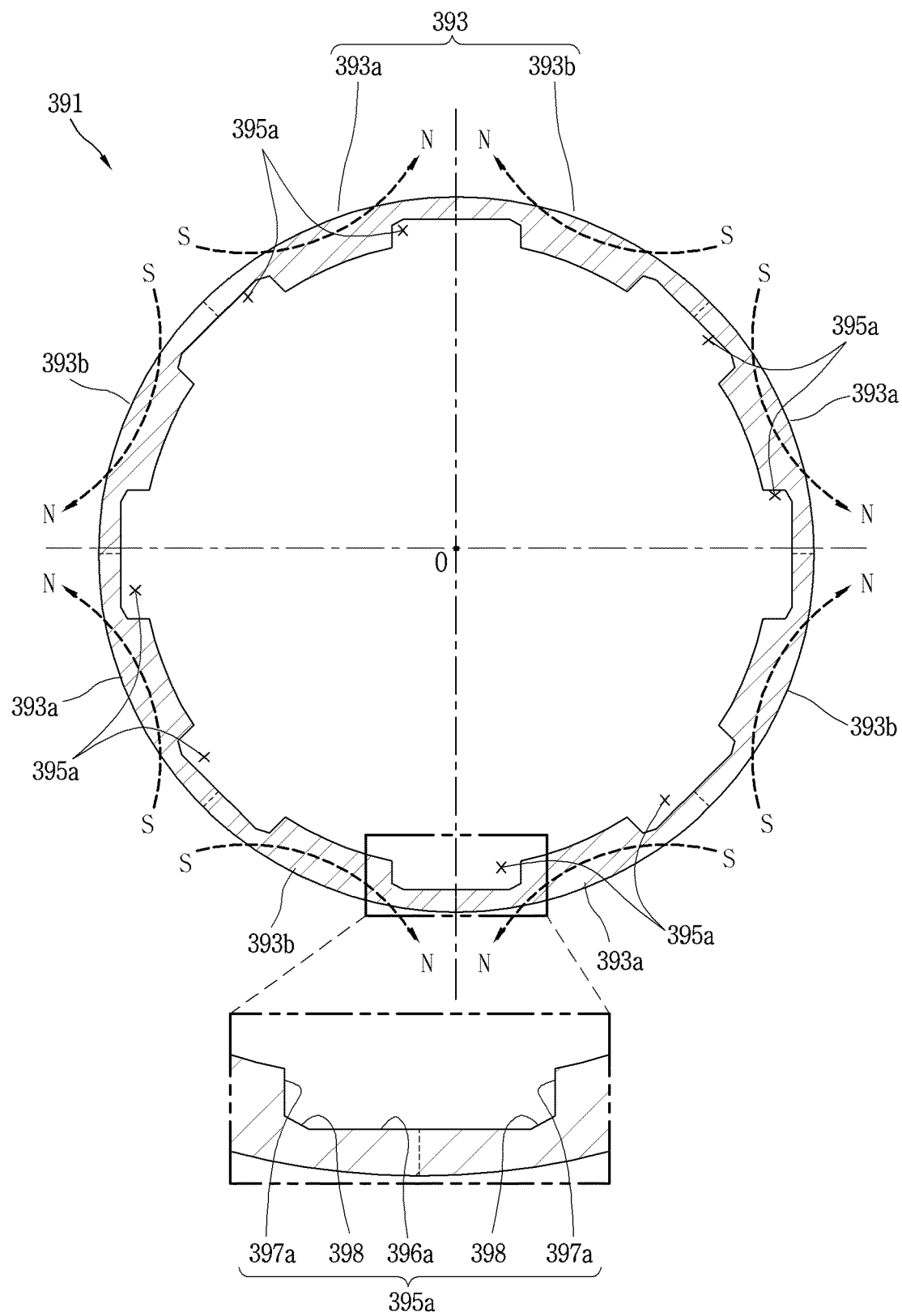
FIG. 18 is an enlarged view of an example first magnet of FIG. 17.
Figure 19:
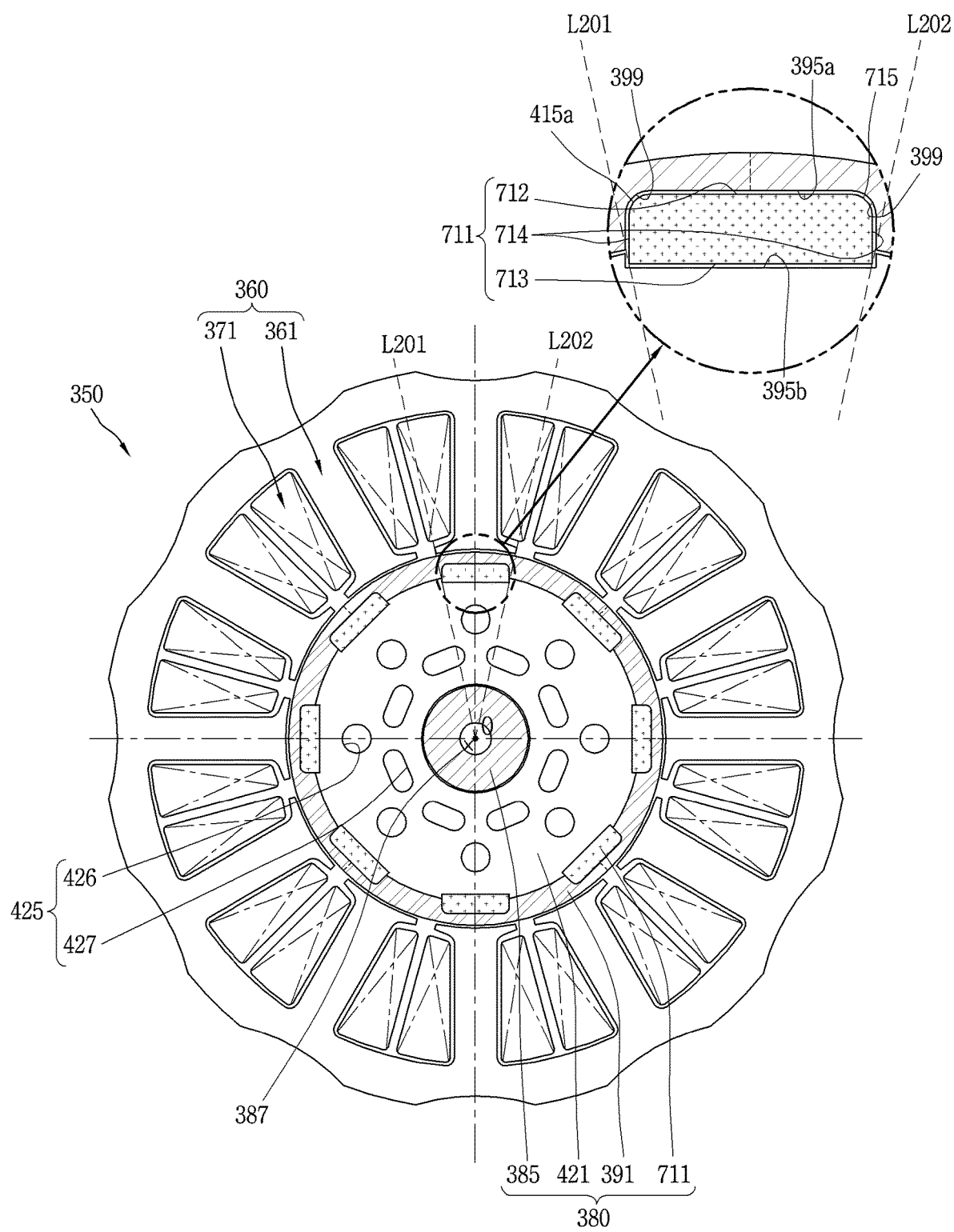
FIG. 19 is an enlarged view of an example permanent magnet of FIG. 17.
Figure 20:
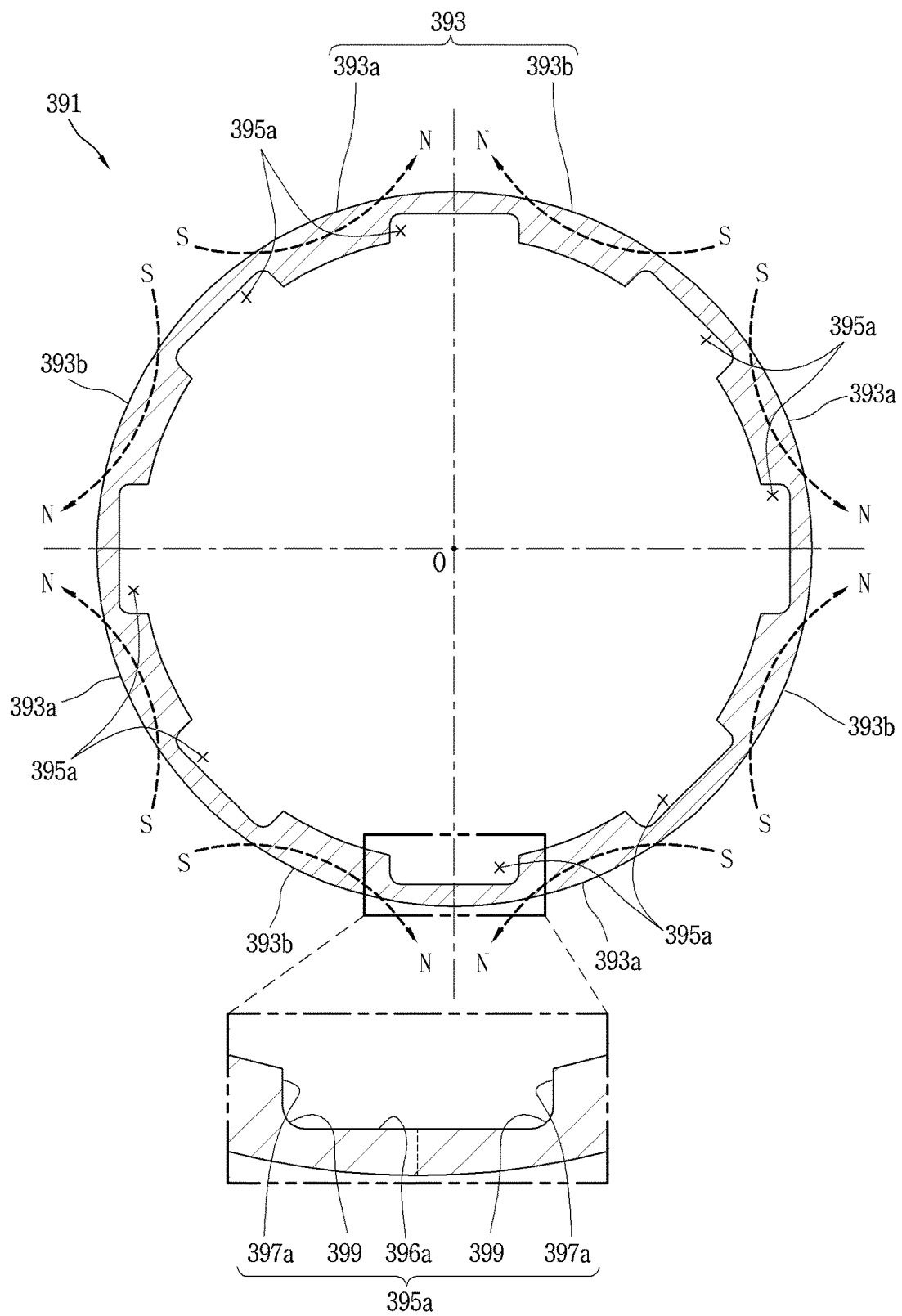
FIG. 20 is an enlarged view of an example first magnet of FIG. 19.

FIG. 17 is a planar view of an example stator and an example rotor of an example electric motor in accordance with another implementation of the present disclosure, FIG. 18 is an enlarged view of an example first magnet of FIG. 17 in accordance with a fifth implementation, FIG. 19 is an enlarged view of an example permanent magnet of FIG. 17 in accordance with a sixth implementation, and FIG. 20 is an enlarged view of an example first magnet of FIG. 19 in accordance with a seventh implementation.

As illustrated in FIG. 17, an electric motor having a permanent magnet according to this implementation includes a stator 360 and a rotor 380. The rotor 380 is provided with a permanent magnet 390 and rotatably disposed with a preset gap G from the stator 360.

The permanent magnet 390 may include a first magnet 391 and a plurality of second magnets 611. The first and second magnets 391 and 611 may be formed of different materials from each other. The first magnet 391 may include a plurality of first magnetic pole portions and a plurality of second magnetic pole portions.

A plurality of magnetic poles may alternately be arranged along a circumferential direction of the first magnet 391. The first magnetic pole portions and the second magnetic pole portions of the first magnet 391 may be alternatively arranged along the circumferential direction so as to form a single ring shape or cylindrical shape.

The second magnet 611 may have a magnetic flux stronger than that of the first magnet 391 and may be disposed at a center of a plurality of magnetic poles of the first magnet 391 to be spaced apart from the gap G relative to the first magnet 391.

The second magnet 611 may include thickness-reduced portions 615, in which a thickness gradually decreases, formed at both end portions thereof along the circumferential direction.

The first magnet 391 may have a cylindrical shape and may be made of a bonded magnet.

The first magnet 391 may be polar-anisotropically magnetized so that a plurality of magnetic poles is formed along the circumferential direction.

The first magnet 391 may include first magnetic pole portions 393a each having opposite magnetic poles at both end parts thereof in a first direction, and second magnetic pole portions 393b each having opposite magnetic poles at both end parts thereof in an opposite direction to the first direction.

The second magnet 611 may have a bar-like shape and may be implemented as a sintered magnet.

On the other hand, the second magnet 611 may be provided with the thickness-reduced portions 615 formed at both end portion thereof to have a gradually decreasing thickness.

Accordingly, even if the second magnet 611 becomes closer to the gap G, it can be prevented that a thickness between the outer diameter surface of the first magnet 391 and the thickness-reduced portion 615 of the second magnet 611 is reduced.

With this configuration, the second magnet 611 is close to the gap G to increase the main magnetic flux, thereby improving the output of the electric motor 150.

In addition, the thickness between the outer diameter surface of the first magnet 391 and the thickness-reduced portion 615 can be secured, thereby preventing the first magnet 391 from being cracked or damaged.

The second magnet 611 may be provided with, for example, an outer surface portion 612, an inner surface portion 613, both side surface portions 614, and thickness-reduced portions 615 all of which form a rectangular shape.

For example, the thickness-reduced portions 615 of the second magnet 611 may be formed in a shape in which both sides of the outer surface portion 612 are cut in an inclined manner.

The first magnet 391 may be provided with second magnet inserting portions 395a in which the second magnets 611 can be inserted.

For example, the second magnet inserting portion 395a of the first magnet 391 may be provided with, as illustrated in FIG. 12, the outer contact portion 396a which is in contact with the outer surface portion 612 of the second magnet 611, inclined portions 398 inclined to be in contact with the thickness-reduced portions 615, and side contact portions 397a which is in contact with the both side surface portions 614 of the second magnet 611.

The second magnet inserting portion 395a of the first magnet 391 may accommodate the outer surface portion 612 of the second magnet 611 closer to the gap G while preventing a thickness between the outer diameter surface of the first magnet 391 and the inclined portions 398 is not reduced to a preset thickness or less due to the inclined portions 398.

In some examples, damage on the first magnet 391 can be reduced, and the main magnetic flux of the gap G can be further increased so as to improve the output of the electric motor 150.

The rotor frame 221 may be provided with second magnet inserting portions 395b in which the second magnets 611 can be inserted, respectively.

In some examples, a second magnet 711, as illustrated in FIG. 19, may be provided with a linear outer surface portion 712, an inner surface portion 713, both side surface portions 714, and curved thickness-reduced portions 615 formed on both sides of the outer surface portion 712 to have reduced thicknesses.

Each of the curved thickness-reduced portions 615 may be formed in an arcuate shape which is outwardly convex, for example.

The first magnet 391 may be provided with second magnet inserting portions 395a in which the second magnets 711 can be inserted.

The second magnet inserting portion 395a of the first magnet 391 may be provided with an outer contact portion 396a that is in contact with the outer surface portion 712 of the second magnet 711, curved surface portions 399 formed on both sides of the outer contact portion 396a to be in contact with the thickness-reduced portions 715, and side contact portions 397a that are in contact with the both side surface portions 714 of the second magnet 711.

Accordingly, the second magnet inserting portion 395a of the first magnet 391 may accommodate the outer surface portion 712 of the second magnet closer to the gap G while a thickness between an outer diameter surface of the first magnet 391 and the curved surface portions 399 is not reduced to a preset thickness or less due to the curved surface portions 399.

According to the configuration, damage on the first magnet 391 can be prevented, and the main magnetic flux of the gap G can be further increased so as to improve the output of the electric motor 150.

The rotor frame 221 may be provided with second magnet inserting portions 395b in which the second magnets 711 can be inserted, respectively.

The foregoing description has been given of specific implementations of the present disclosure. However, the present disclosure may be embodied in various forms without departing from the spirit or essential characteristics thereof, and thus the above-described implementations should not be limited by the details of the detailed description.

In addition, even implementations not listed in the detailed description should be interpreted within the scope of the technical idea defined in the appended claims. It is intended that the present disclosure cover the modifications and variations of this disclosure provided they come within the scope of the appended claims and their equivalents.

What is claimed is:

1. An electric motor, comprising:
    a stator; and
    a rotor spaced apart from the stator by a gap in a radial direction of the rotor and configured to rotate with respect to the stator, the rotor comprising a rotation shaft, a rotor magnet that is located at an outer circumferential portion of the rotor, and a rotor frame that is made of a non-magnetic material, that is disposed between the rotation shaft and the rotor magnet, and that is configured to rotatably support the rotor magnet,
    wherein the rotor magnet comprises:
        a first magnet that has a cylindrical shape, that is configured to generate first magnetic flux, and that is configured to be polar-anisotropically magnetized to generate a magnetic field in the gap at an outside of the first magnet, the first magnet comprising:
            a plurality of first magnetic portions arranged in a circumferential direction of the rotor, and
            a plurality of second magnetic portions alternately arranged with the plurality of first magnetic portions along the circumferential direction of the rotor, and
        a plurality of second magnets that are each located between a first magnetic portion of the plurality of first magnetic portions and a second magnetic portion of the plurality of second magnetic portions that is adjacent to the first magnetic portion, each second magnet being configured to generate second magnetic flux that is greater than the first magnetic flux generated by the first magnet,
    wherein the first magnet and the rotor frame define a plurality of second magnet inserting portions arranged along the circumferential direction, each second magnet inserting portion being configured to receive one of the plurality of second magnets between the first magnet and the rotor frame, and
    wherein each of the plurality of second magnets has an outer side inserted into the first magnet and an inner side inserted into the rotor frame.

2. The electric motor of claim 1, wherein the first magnet comprises a magnet manufactured by bonding.

3. The electric motor of claim 1, wherein the plurality of second magnets comprise a magnet manufactured by sintering.

4. The electric motor of claim 1, wherein each second magnet is configured to insert between the first magnet and the rotor frame along an axial direction of the rotor.

5. The electric motor of claim 1, wherein the rotor frame defines a through hole that penetrates the rotor frame in an axial direction of the rotor.

6. The electric motor of claim 1, wherein each second magnet is configured to couple to an inside of the first magnet recessed from an inner surface of the first magnet toward the gap,
    wherein an outer surface of each second magnet facing toward the gap has a curved shape corresponding to a shape of an outer surface of the first magnet, and
    wherein a distance between the outer surface of each second magnet and the outer surface of the first magnet is constant.

7. The electric motor of claim 1, wherein each second magnet has:
    an outer surface portion that is curved and that faces toward the first magnet; and
    an inner surface portion that is flat and that is located radially inward of the outer surface portion.

8. The electric motor of claim 1, wherein each second magnet has:
    an outer surface portion that faces toward the first magnet; and
    an inner surface portion that is disposed radially inward of the outer surface portion, and wherein the outer surface portion includes end parts, a thickness from the inner surface portion to the end parts decreasing in the circumferential direction of the rotor.

9. A compressor, comprising:
a case;
a compressor located inside of the case and configured to compress fluid; and
the electric motor according to claim 1, the electric motor being located inside of the case.

10. The electric motor of claim 1, wherein each of the plurality of first magnetic portions has a first polarity and a second polarity that are magnetically opposite to each other and that are configured to generate a portion of the magnetic field in the gap,
wherein each of the plurality of second magnetic portions has a first polarity and a second polarity that are magnetically opposite to each other and that are configured to generate a portion of the magnetic field in the gap, and
wherein the first magnet is located radially between the gap and the plurality of second magnets.

11. The electric motor of claim 10, wherein each first magnetic portion has the first polarity and the second polarity at end parts of a respective first magnetic portion, each first magnetic portion being configured to generate a first magnetic field from the first polarity to the second polarity in a first direction, and
wherein each second magnetic portion has the first polarity and the second polarity at end parts of a respective second magnetic portion, each second magnetic portion being configured to generate a second magnetic field from the first polarity to the second polarity in a second direction opposite to the first direction.

12. The electric motor of claim 11, wherein the first magnet further comprises a plurality of boundary regions that are each located between a first magnetic portion of the plurality of first magnetic portions and a second magnetic portion that is adjacent to the first magnetic portion,
wherein each of the plurality of second magnet inserting portions is defined at the plurality of boundary regions, and
wherein each boundary region faces the first polarity of each of the first magnetic portion and the second magnetic portion or the second polarity of each of the first magnetic portion and the second magnetic portion.

13. The electric motor of claim 12, wherein each second magnet has a first polarity and a second polarity that are magnetically opposite to each other and that are disposed in the radial direction of the rotor, and
wherein a polarity of each second magnet at a boundary region of the plurality of boundary regions corresponds to one of the first polarity or the second polarity that is generated by the first magnetic portion of the plurality of first magnetic portions and the second magnetic portion that is adjacent to the first magnetic portion.

14. The electric motor of claim 10, wherein the plurality of first magnetic portions and the plurality of second magnetic portions correspond to a plurality of magnetic poles of the rotor, and
wherein the stator comprises a plurality of poles and a plurality of slots that are alternately arranged along a circumferential direction of the stator, a number of the plurality of slots of the stator being different than a number of the plurality of magnetic poles of the rotor.

15. The electric motor of claim 14, wherein each pole of the stator comprises a pole shoe that extends in the circumferential direction of the stator and that has a size corresponding to a size of each second magnet of the rotor.

16. The electric motor of claim 15, wherein a second magnet of the plurality of second magnets is located between extension lines that respectively extend from a center of the rotor to ends of the pole shoe, the second magnet having a first end and a second end, and
wherein an internal angle between a first extension line extending from the center of the rotor to the first end of the second magnet and a second extension line extending from the center of the rotor to the second end of the second magnet is in a range from 19° to 26°.

17. The electric motor of claim 14, wherein a distance from each second magnet to an outer surface of the first magnet is greater than or equal to 1 mm.

18. The electric motor of claim 1, wherein the magnetic field in the gap is not formed in the first magnet.

* * * * *